(12) United States Patent
Hiller

(10) Patent No.: US 12,520,753 B2
(45) Date of Patent: Jan. 13, 2026

(54) FOLDABLE HANDLES FOR HIGH-EFFICIENCY TURF MAINTENANCE TOOL

(71) Applicant: MTD PRODUCTS INC, Valley City, OH (US)

(72) Inventor: Adam Hiller, Jeromesville, OH (US)

(73) Assignee: MTD Products Inc, Valley City, OH (US)

( * ) Notice: Subject to any disclaimer, the term of this patent is extended or adjusted under 35 U.S.C. 154(b) by 615 days.

(21) Appl. No.: 17/849,136

(22) Filed: Jun. 24, 2022

(65) Prior Publication Data

US 2022/0408640 A1    Dec. 29, 2022

Related U.S. Application Data

(60) Provisional application No. 63/214,547, filed on Jun. 24, 2021.

(51) Int. Cl.
| | |
|---|---|
| *A01D 34/82* | (2006.01) |
| *A01D 34/68* | (2006.01) |
| *A01D 34/78* | (2006.01) |

(52) U.S. Cl.
CPC .......... *A01D 34/824* (2013.01); *A01D 34/68* (2013.01); *A01D 34/6818* (2013.01); *A01D 2034/6843* (2013.01); *A01D 34/78* (2013.01)

(58) Field of Classification Search
CPC .. A01D 34/824; A01D 34/78; A01D 34/6818; A01D 2034/6837; A01D 2034/6818
See application file for complete search history.

(56) References Cited

U.S. PATENT DOCUMENTS 5,163,275 A * 11/1992 Hare .................... A01D 34/824
                                                  56/DIG. 18
5,209,051 A * 5/1993 Langdon ................ A01D 34/82
                                                   56/DIG. 18

(Continued)

FOREIGN PATENT DOCUMENTS

| CA | 2829898 C | 7/2016 |
|---|---|---|
| CN | 112512300 A | 3/2021 |

(Continued)

OTHER PUBLICATIONS

International Search Report and Written Opinion for International Patent Application No. PCT/US2022/035025, dated Oct. 24, 2022.

*Primary Examiner* — Joseph M Rocca
*Assistant Examiner* — Julia C Tran
(74) *Attorney, Agent, or Firm* — Wegman Hessler Valore

(57) ABSTRACT

A turf maintenance apparatus having folding handles facilitating compact storage is presented herein. The folding handles can be compressed or extended to adjust overall length and can rotate between an extended operator position and a folded storage position. Depending on implementation, the folding handles can be locked in the folded storage position and can also lock in the extended operator position. One or more operator presence devices can disable operation of a motor or engine when deactivated. A first operator presence device can deactivate operation of the motor or engine when the folding handles are not locked in the extended operator position, and a second operator presence device can deactivate operation of the motor or engine absent an operator maintaining activation of the second operator presence device.

25 Claims, 15 Drawing Sheets

(56) References Cited

U.S. PATENT DOCUMENTS

| | | | |
|---|---|---|---|
| 5,261,215 A | 11/1993 | Hartz et al. | |
| 7,178,322 B2* | 2/2007 | Osborne | A01D 34/824 |
| | | | 56/10.8 |
| 7,231,755 B2 | 6/2007 | Clarke | |
| 2013/0111866 A1* | 5/2013 | Schmalz | A01D 34/81 |
| | | | 123/196 R |
| 2013/0111867 A1* | 5/2013 | Schmalz | A01D 34/82 |
| | | | 123/196 R |
| 2014/0331809 A1* | 11/2014 | Mikula | A01D 34/824 |
| | | | 74/491 |
| 2016/0198627 A1* | 7/2016 | Wadzinski | A01D 34/001 |
| | | | 56/320.1 |
| 2017/0086370 A1* | 3/2017 | Yamaoka | A01D 34/828 |
| 2019/0075726 A1 | 3/2019 | White et al. | |
| 2020/0000030 A1* | 1/2020 | Wei | A01D 75/18 |
| 2020/0060091 A1* | 2/2020 | Yamaoka | A01D 34/67 |
| 2020/0107497 A1* | 4/2020 | Ferrell | A01D 34/824 |
| 2020/0245555 A1 | 8/2020 | Colber et al. | |
| 2021/0015038 A1* | 1/2021 | Yamaoka | A01D 34/824 |
| 2021/0243948 A1* | 8/2021 | Burns, III | A01D 34/828 |
| 2021/0251139 A1* | 8/2021 | Frick | G05D 1/027 |
| 2022/0124982 A1 | 4/2022 | Yamaoka et al. | |
| 2022/0256767 A1* | 8/2022 | Colber, Jr. | A01D 34/824 |
| 2022/0346312 A1* | 11/2022 | Takahashi | A01D 34/68 |

FOREIGN PATENT DOCUMENTS

| | | |
|---|---|---|
| DE | 20 2012 102708 U1 | 8/2012 |
| EP | 3381259 A1 | 3/2018 |
| EP | 2774470 B1 | 3/2019 |

* cited by examiner

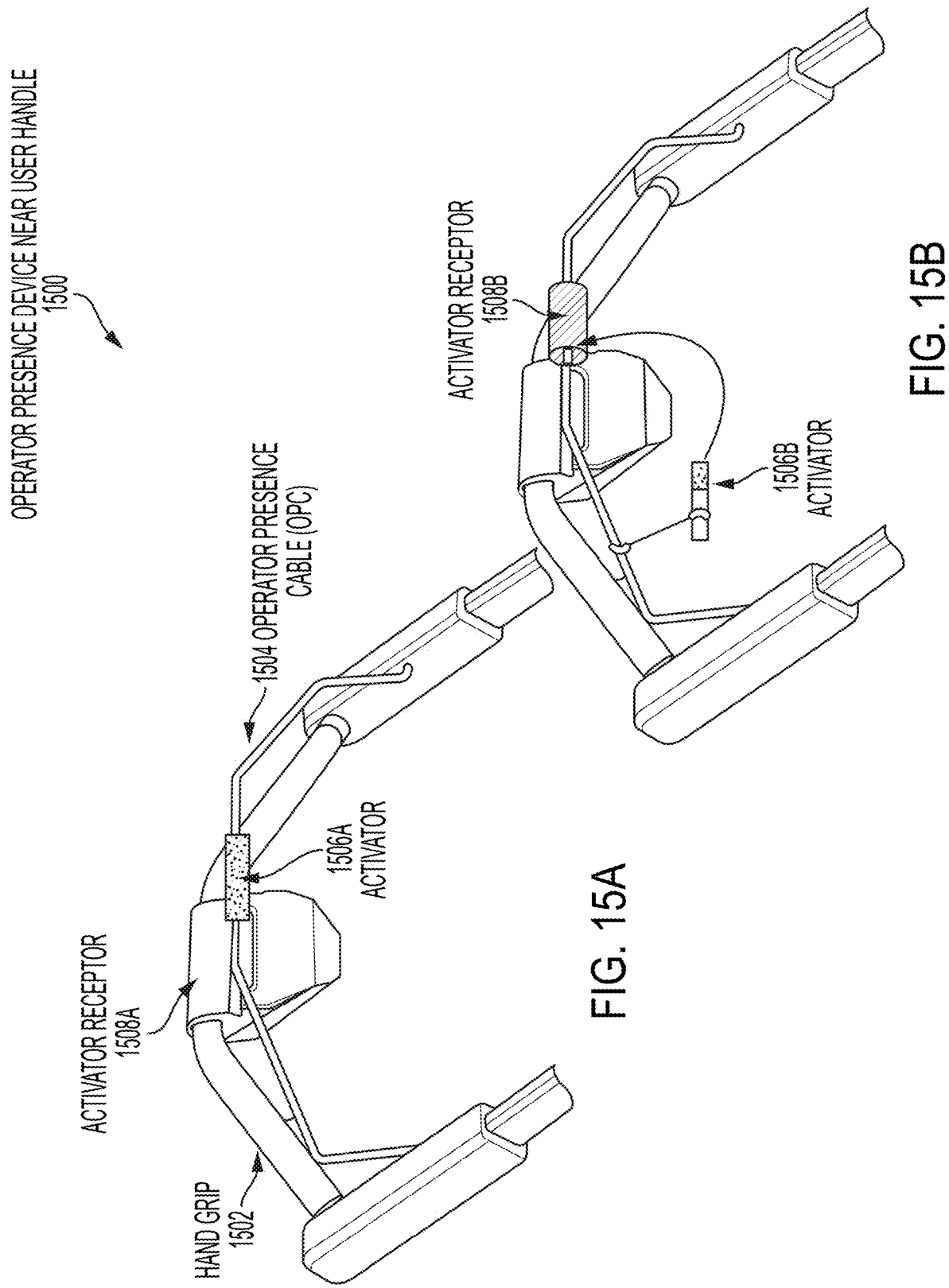

FOLDABLE HANDLES FOR HIGH-EFFICIENCY TURF MAINTENANCE TOOL

CROSS-REFERENCE TO RELATED APPLICATIONS

This application claims the benefit of and priority to U.S. Provisional Patent Application Ser. No. 63/214,547 filed Jun. 24, 2021, and titled FOLDABLE HANDLES FOR HIGH-EFFICIENCY TURF MAINTENANCE TOOL, which is herein incorporated by reference in its entirety.

INCORPORATION BY REFERENCE

The following are hereby incorporated by reference within the present disclosure in their respective entireties and for all purposes: US Patent Publication No. 2016/0353659 published Dec. 8, 2016; U.S. patent application Ser. No. 17/700,255 filed Mar. 21, 2022 and titled BAGGING APPARATUS FOR HIGH-EFFICIENCY LAWN MAINTENANCE TOOL; and U.S. Provisional Application No. 63/163,386 filed Mar. 26, 2021.

FIELD OF DISCLOSURE

The disclosed subject matter pertains to a walk-behind lawn maintenance device with foldable handles.

BACKGROUND

Manufacturers of power equipment for outdoor maintenance applications offer many types of machines for general maintenance and mowing applications. Generally, these machines can have a variety of forms depending on application, from general urban or suburban lawn maintenance, rural farm and field maintenance, to specialty applications. Even specialty applications can vary significantly. For example, mowing machines suitable for sporting events requiring moderately precise turf, such as soccer fields or baseball outfields may not be suitable for events requiring very high-precision surfaces such as golf course greens, tennis courts and the like.

Modern maintenance machines also offer multiple options for power source. The various advantages associated with electric motor engines, gasoline engines, natural gas engines, diesel engines and so forth also impact the mechanical design and engineering that go into these different maintenance devices. Meeting the various challenges associated with different maintenance and mowing applications and the benefits and limitations of different power sources results in a large variety of maintenance machines to meet consumer preferences.

BRIEF SUMMARY

The following presents a simplified summary in order to provide a basic understanding of some aspects of the disclosure. This summary is not an extensive overview of the disclosure. It is not intended to identify key/critical elements or to delineate the scope of the disclosure. Its sole purpose is to present some concepts of the disclosure in a simplified form as a prelude to the more detailed description that is presented later.

Various embodiments of the present disclosure provide a walk-behind turf maintenance apparatus having compact folding handles. In an embodiment, the folding handles can partially collapse to facilitate extending and shortening a length of the folding handles. In further embodiments, the folding handles can lock in an extended position for use and can lock in a folded position for storage. In still further embodiments, the handles can both collapse and fold over a body of the walk-behind turf maintenance apparatus. In an additional embodiment, when collapsed and folded over the body of the apparatus, the handles can be contained within a perimeter of the apparatus, yielding a compact position for storage. In still further embodiments, an operator presence device can prevent starting or running of a motor of the turf maintenance apparatus when activated (or deactivated, depending on convention). The operator presence device can be activated in response to the handles being unlocked from a locked, extended position in an embodiment. In other embodiments, the operator presence device can be activated in response to separation of an operator presence bar becoming separated from a user hand grip of the turf maintenance apparatus. In still other embodiments, the operator presence device can be activated in response to a magnetic component of the operator presence device being decoupled from a magnetic seat component of the operator presence device, in an embodiment.

In additional embodiments, disclosed is a walk-behind grass mowing apparatus. The apparatus can comprise a mow deck formed within or secured to a support structure; at least one front wheel and at least one rear wheel secured to the support structure; and a plurality of blades rotatably secured within the mow deck. Additionally, the apparatus can comprise a prime mover secured to the support structure and, when activated, providing mechanical force to the plurality of blades. Moreover, the apparatus can comprise an operator handle secured to the support structure and having an extended position and a folded position, wherein the extended position orients the operator handle at a position above and behind the mow deck and wherein in the folded position the operator handle is bound within a perimeter of a top surface of the support structure.

In a further embodiment, an operator handle for a turf maintenance apparatus. The turf maintenance apparatus can comprise an upper handle portion comprising an operator grip. In addition, the turf maintenance apparatus can comprise a lower handle portion comprising a mount hole and a lower plunger having a lower plunger slide range, wherein the mount hole and the lower plunger slide range at least in part overlap and house a fastener that secures the lower handle portion to the turf maintenance apparatus, wherein the lower plunger is configured to slide within the lower handle portion is configured to rotate about the fastener at a rotation point coincident with the mount hole. Further to the above, the turf maintenance apparatus can comprise a locking mechanism located near a top of the lower handle portion comprising an actuator and an actuator arm, wherein the actuator arm is configured to lock the upper handle portion in an extended position with respect to the lower handle portion and wherein the actuator is configured to release the actuator arm and unlock the upper handle portion to move relative the lower handle portion.

One or more other embodiments disclose a base for securing an operator handle of a walk-behind turf maintenance apparatus. The base can comprise a first housing comprising a base plunger and a base plunger bias that applies a force to the base plunger pushing a top if the base plunger through a hole in a seat of the first housing, wherein the base plunger engages a bottom of the operator handle and locks the operator handle in a first orientation when the bottom of the operator handle is positioned at the seat of the first housing. Moreover, the turf maintenance apparatus can comprise a second housing comprising a second seat and a hole in the second seat that is engaged by a lower plunger of the bottom of the operator handle that locks the operator handle in a second orientation when the bottom of the operator handle is positioned at the second seat of the second housing. In addition to the foregoing, the first housing and the second housing are displaced on a surface of the base and the first seat faces a first direction and the second seat faces a second direction, wherein the first and second directions are separated by an angle equal to or greater than ninety degrees.

To accomplish the foregoing and related ends, certain illustrative aspects of the disclosure are described herein in connection with the following description and the drawings. These aspects are indicative, however, of but a few of the various ways in which the principles of the disclosure can be employed and the subject disclosure is intended to include all such aspects and their equivalents. Other advantages and features of the disclosure will become apparent from the following detailed description of the disclosure when considered in conjunction with the drawings.

BRIEF DESCRIPTION OF THE DRAWINGS

FIGS. 15A and 15B illustrate example alternative operator presence devices for a turf maintenance apparatus, in still further embodiments.

Figure 1:
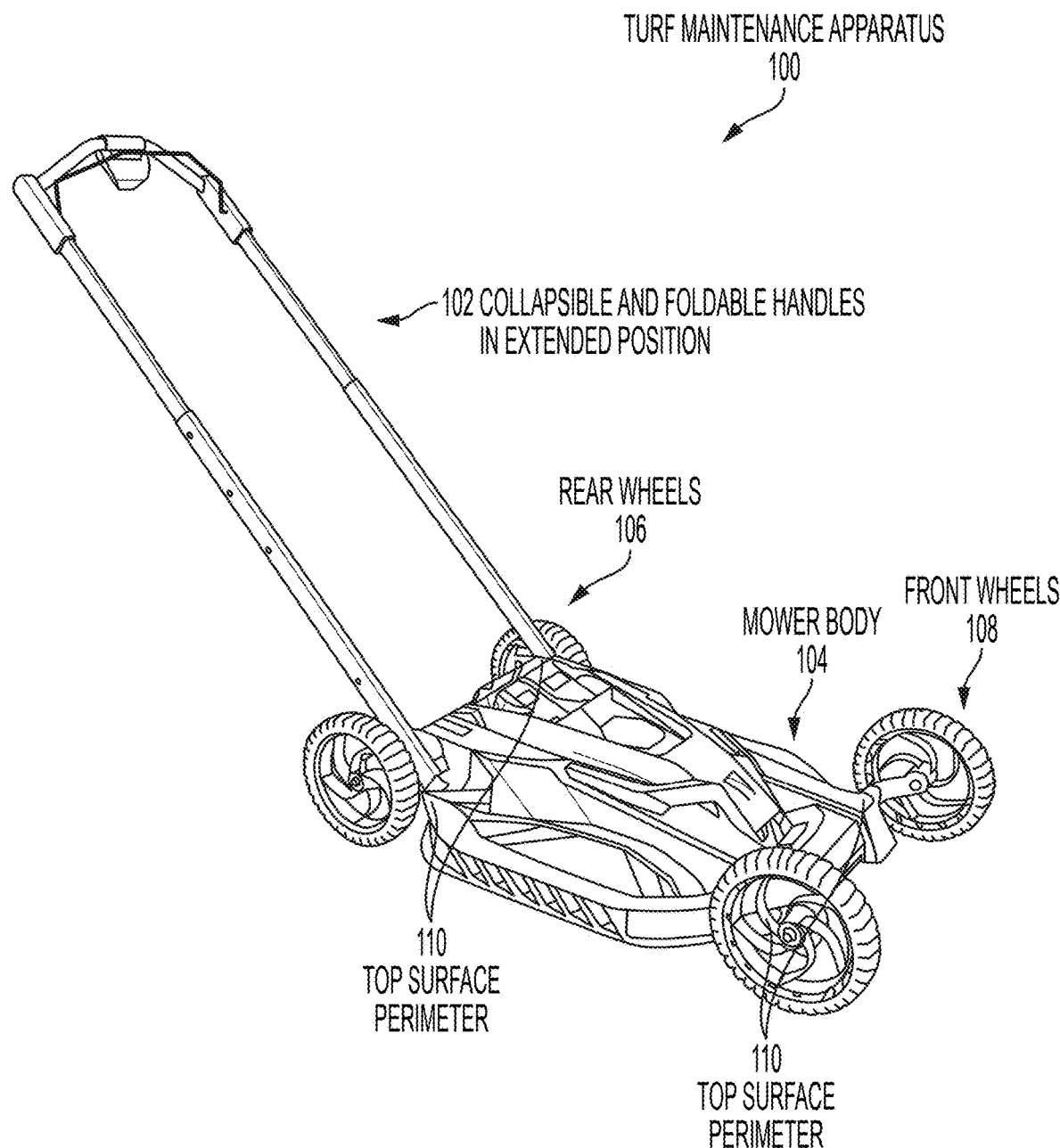
FIG. 1 provides an example illustration of a high efficiency (HE) turf maintenance apparatus with handles in an extended position, in disclosed embodiments.

It should be noted that the drawings are diagrammatic and not drawn to scale. Relative dimensions and proportions of parts of the figures have been shown exaggerated or reduced in size for the sake of clarity and convenience in the drawings. The same reference numbers are generally used to refer to corresponding or similar features in the different embodiments, except where clear from context that same reference numbers refer to disparate features. Accordingly, the drawings and description are to be regarded as illustrative in nature and not as restrictive.

While embodiments of the disclosure pertaining to machine vision systems for power equipment machines are described herein, it should be understood that the disclosed machines, electronic and computing devices and methods are not so limited and modifications may be made without departing from the scope of the present disclosure. The scope of the systems, methods, and electronic and computing devices for machine vision devices are defined by the appended claims, and all devices, processes, and methods that come within the meaning of the claims, either literally or by equivalence, are intended to be embraced therein.

DETAILED DESCRIPTION

The following terms are used throughout the description, the definitions of which are provided herein to assist in understanding various aspects of the subject disclosure.

As used in this application, the terms "outdoor power equipment", "outdoor power equipment machine", "power equipment", "maintenance machine" and "power equipment machine" are used interchangeably and are intended to refer to any of robotic, partially robotic ride-on, walk-behind, sulky equipped, autonomous, semi-autonomous (e.g., user-assisted automation), remote control, or multi-function variants of any of the following: powered carts and wheel barrows, lawn mowers, lawn and garden tractors, lawn trimmers, lawn edgers, lawn and leaf blowers or sweepers, hedge trimmers, pruners, loppers, chainsaws, rakes, pole saws, tillers, cultivators, aerators, log splitters, post hole diggers, trenchers, stump grinders, snow throwers (or any other snow or ice cleaning or clearing implements), lawn, wood and leaf shredders and chippers, lawn and/or leaf vacuums, pressure washers, lawn equipment, garden equipment, driveway sprayers and spreaders, and sports field marking equipment.

FIG. 1 illustrates a turf maintenance apparatus 100 according to one or more disclosed embodiments. In some embodiments, turf maintenance apparatus 100 can be a high efficiency (HE) turf maintenance apparatus powered by an electric motor. The electric motor can receive electric power from a battery(ies) mounted on mower body 104, or from an electric cable connected to an electric power source external to turf maintenance apparatus 100, or a combination of the foregoing in some embodiments. In other embodiments, turf maintenance apparatus 100 can be powered by any suitable combustion engine as an alternative to the electric motor. In particular embodiments, turf maintenance apparatus 100 can have handles that can fold or collapse over a mower body 104 of turf maintenance apparatus 100 (e.g., collapsible and foldable handles 102). When folded over mower body 104, the handles can be bound within a perimeter of a top surface 110 of mower body, in at least some disclosed embodiments.

Turf maintenance apparatus 100 can have an integrated or combined mower body 104 including a mow deck portion and structural support (also referred to as a frame), in some embodiments. As illustrated, mower body 104 is secured to front wheels 108, rear wheels 106 and collapsible and foldable handles 102, and can have the motive power source (e.g., electric motor, combustion engine, etc.) secured to mower body 104 as well as one or more batteries. In an alternative embodiment, mower body 104 can be embodied as a separate mower deck secured to a structural support (e.g., a mower frame), which in turn is secured to front wheels 108, rear wheels 106 and collapsible and foldable handles 102 (e.g., see FIG. 2, infra). Although not depicted, mower body 104 can be connected to a bagging device that covers a turf ejection port and collects turf clippings into a bag portion of the bagging device. In an embodiment, such a bagging device can be as described in U.S. Provisional Patent Application No. 63/163,386 filed by the assignee of the present application for patent and incorporated by reference hereinabove.

FIG. 1 illustrates collapsible and foldable handles 102 in an extended position. When the handles are collapsed (e.g., the lighter shaded upper portion of the handles extended into the darker shaded bottom portion of the handles), collapsible and foldable handles 102 can be folded atop mower body 104. In an embodiment(s), the collapsed handles can have a length and width dimension equal to or less than a perimeter of top surface 110 of mower body 104. In such embodiment(s), turf maintenance apparatus 100 can occupy a volume no greater than that bounded by diameters of the four wheels of lawn maintenance apparatus 100 (e.g., as illustrated by collapsed and folded handles 200 of FIG. 2, infra).

In one or more additional embodiments, collapsible and foldable handles 102 can lock in place in their extended position illustrated in FIG. 1. In still further embodiments, the handles can also lock in place when in their folded position illustrated in FIG. 2. A handle locking mechanism and one or more locking bases can facilitate locking and releasing of collapsible and foldable handles 102 between extended and folded positions (e.g., see FIGS. 2-8, and 12-14 infra).

In yet other embodiments, one or more operator presence devices can be provided that prevent operation of the mechanical power source when one of the operator presence devices is deactivated. In at least one embodiment, an operator presence device can be located near a user hand grip portion of collapsible and foldable handles 102 or an operator presence cable (OPC) adjacent to the user hand grip portion (e.g., see FIGS. 15A and 15B, infra). In an alternative or additional embodiment, an operator presence device can be located at least in part within an interior of collapsible and foldable handles 102, at least in part within the handle locking mechanism introduced above, or a suitable combination of the foregoing (e.g., see FIGS. 6-8, infra).

Figure 2:
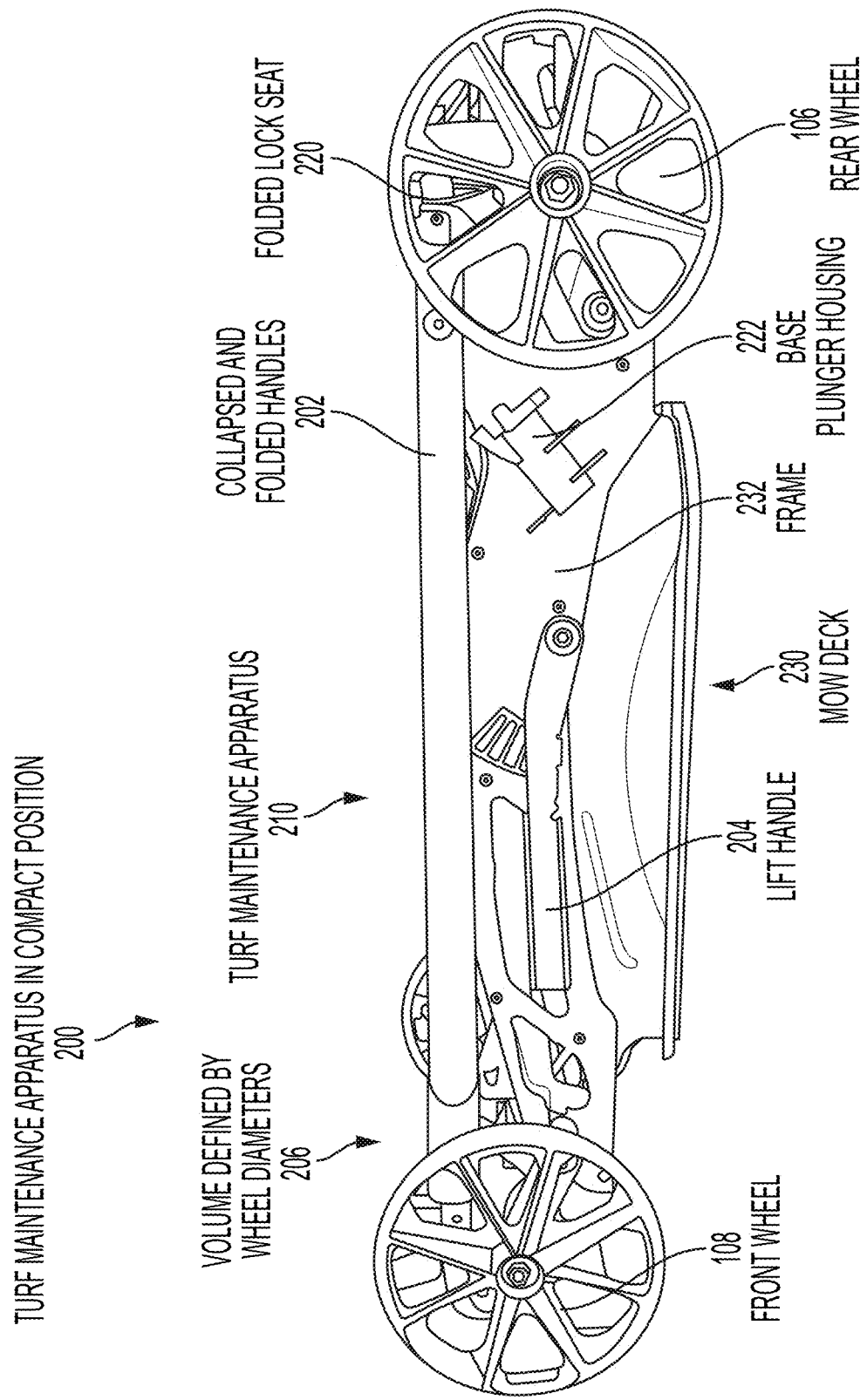
FIG. 2 depicts an example turf maintenance apparatus in a compact position with folded and locked handles, according to further embodiments of the present disclosure.

FIG. 2 illustrates a compact position 200 for a turf maintenance apparatus 210 according to further embodiments of the present disclosure. In various embodiments, compact position 200 can confine turf maintenance apparatus 1400 to a volume defined by the wheels of the turf maintenance apparatus 210. With different words, a volume defined by wheel diameters 206 can include a perimeter in two dimensions defined by the outer diameters of front wheel 108 and rear wheel 106, which extends into a third dimension to encompass the diameters of the other two wheels (into the page of FIG. 2) and define a three-dimensional volume. This compact position 200 allows for highly efficient storage of turf maintenance apparatus 210, even to include dense packaging for shipping, dense stacking in a warehouse environment, and so forth.

Compact position 200 illustrates collapsed and folded handles 202 fully collapsed such that an upper portion of the handles is extended into a lower portion of the handles. Further, the collapsed handles are then rotated downward onto a top of the mower body (e.g., top surface perimeter 110 of FIG. 1, supra). In the extended position, the lower portion of the handles can be locked into a base plunger housing 222. Locking of the handles facilitates good transfer of momentum from the handles to the mower body for pushing turf maintenance apparatus 210. When released from the base plunger housing 222 (e.g., see FIGS. 8-12, infra) the handles are free to rotate and a force on the handles will rotate the handles from the extended position to the folded position. When fully rotated on top of the mower body into the folded position illustrated by collapsed and folded handles 202, the lower portion of the handles can lock into folded lock seat 220 (e.g., see FIGS. 12-14, infra).

Additionally, turf maintenance apparatus 210 can comprise a lift handle 204 that facilitates raising and lowering the mower body relative to front wheel 108 and rear wheel 106, to transition between storage and mowing, as well as provide different mow deck heights (and therefore mowing heights) during operation of turf maintenance apparatus 210. As illustrated in compact position 200, lift handle 204 is in a lowest position. Note that while in compact position 200, turf maintenance apparatus 210 can still be within the volume defined by wheel diameters 206, stated above.

FIG. 2 illustrates an alternative turf maintenance apparatus 210 having a mow deck 230 (removably) secured to a structural support, such as a frame 232. This is an alternative to the integrated mow deck and frame/structural support of mower body 104 of turf maintenance apparatus 100, supra. Turf maintenance apparatus 210 can be a modular apparatus, in some embodiments, in which different size mow decks with different widths, lengths, diameters, etc., can be secured to frame 232. Stated differently, in one or more additional embodiments, turf maintenance apparatus 210 can be configured with interchangeable mow decks, and mow deck sizes. Accordingly, different size mow decks 230 could be connected to mower frame 232 by suitable fastening devices. Interchangeability of mow deck size can allow for multiple models to be assembled yielding devices with different sized radii of cut and associated parameters. For example, a manufacturer could assemble disclosed turf maintenance apparatus 210 to different sized mow decks, with single blade models, multiple blade models and so forth according to this embodiment(s). In a further embodiment, mower frame 232 can be adjustable in width or length or both to accommodate different diameter mow deck sizes. As a further example, turf maintenance apparatus 210 can be adjustable in wheelbase or width, in some embodiments. As an illustrative example, mower frame 232 could be collapsible in a width direction (e.g., from left side to right side, viewed from an operator's position behind turf maintenance apparatus 210) to maintain a desired frame width to mow deck diameter. With more detail to one example embodiment, mower frame 232 could comprise a central portion including inter-connected telescoping structural supports (e.g., tubes, rods, arms, beams, and so forth) of different diameter with an inner support(s) that can be adjusted further inward of an outer support(s) (to reduce mower frame width) or adjusted further outward of the outer support(s) (to increase mower frame width). Width can be expanded/contracted with two or more telescoping inner/outer diameter supports, or in another embodiment the frame can be modular with left-right frame arms (not depicted) that secure to different sized central portions—resulting in different widths between the left-right frame arms—to expand/contract the width of the mow deck. Other adjustable frame mechanisms known in the art or reasonably suggested to one of ordinary skill in the art by way of the context provided herein are considered within the scope of the present disclosure.

Figure 3:
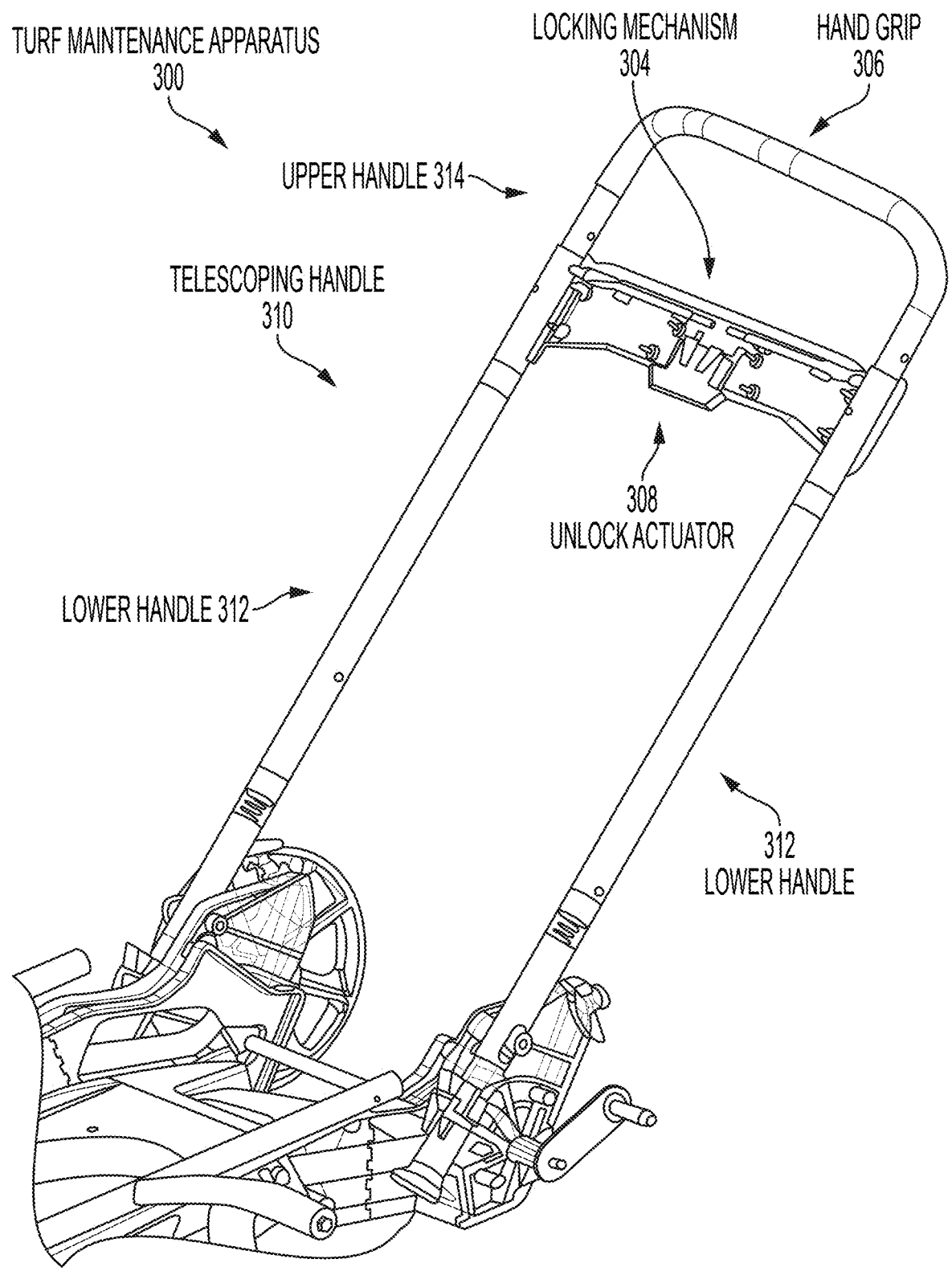
FIG. 3 depicts a sample turf maintenance apparatus with a handle extension/retraction and locking mechanism, in further embodiments.

FIG. 3 illustrates a diagram of an example turf maintenance apparatus 300 according to further embodiments of the present disclosure. Turf maintenance apparatus 310 is illustrated with telescoping handles 310 facilitating extension and collapse of an upper handle 314 within (or around, in alternative embodiments) a lower handle 312. FIG. 3 is illustrated with lower handle 312 being partially transparent so that upper handle 314 is visible within an interior of lower handle 312. In the embodiment illustrated by FIG. 3, telescoping handle 310 can extend or collapse by upper handle 314 being pulled out from within lower handle 312, or by upper handle 314 being pushed into lower handle 312, respectively. In alternative embodiments, lower handle 312 can have a smaller diameter than upper handle 314, and upper handle can collapse by being pushed down and over the smaller diameter of lower handle 312, and can extend by being pulled out and away from lower handle 312. A hand grip 306 is illustrated for applying force to the upper handle 314 to facilitate pushing upper handle 314 downward with respect to lower handle 312, or pulling upper handle 314 upward with respect to lower handle 312.

Also illustrated is a locking mechanism 304 configured to lock upper handle 314 into one or more positions with respect to lower handle 312. In some embodiments, locking mechanism 304 can be configured to lock upper handle 314 in an extended position(s) (e.g., fully extended position) or can be configured to lock upper handle 314 in a collapsed position(s) (e.g., fully collapsed position), or both. In still other embodiments, locking mechanism 304 can be configured to lock upper handle 312 into one or more positions between a fully extended position and a fully collapsed position. Thus, as an example, locking mechanism 304 and upper handle 314 (or lower handle 312) can be configured to lock upper handle 314 at one or more distinct intermediate positions between the fully extended position and the fully collapsed position, allowing an operator to select a length of telescoping handle 310 that corresponds to one of the intermediate positions. Moreover, locking mechanism 304 can be configured to lock the upper handle 314 at an operator-selected intermediate position(s) to secure the telescoping handle 310 at the selected length thereof.

Unlock actuator 308 provides an example embodiment for locking or locking upper handle 314 with respect to lower handle 312, as described above. Unlock actuator 308 can be mechanically depressed, or otherwise actuated, by an operator to unlock upper handle 314 from lower handle 312. In some alternative embodiments, unlock actuator 308 can instead be a locking actuator that effectuates locking of upper handle 314 with respect to lower handle 312 when depressed or otherwise actuated by the operator. In at least one embodiment, unlock actuator 308 can be a lock/unlock actuator combining the above functionality.

Figure 4:
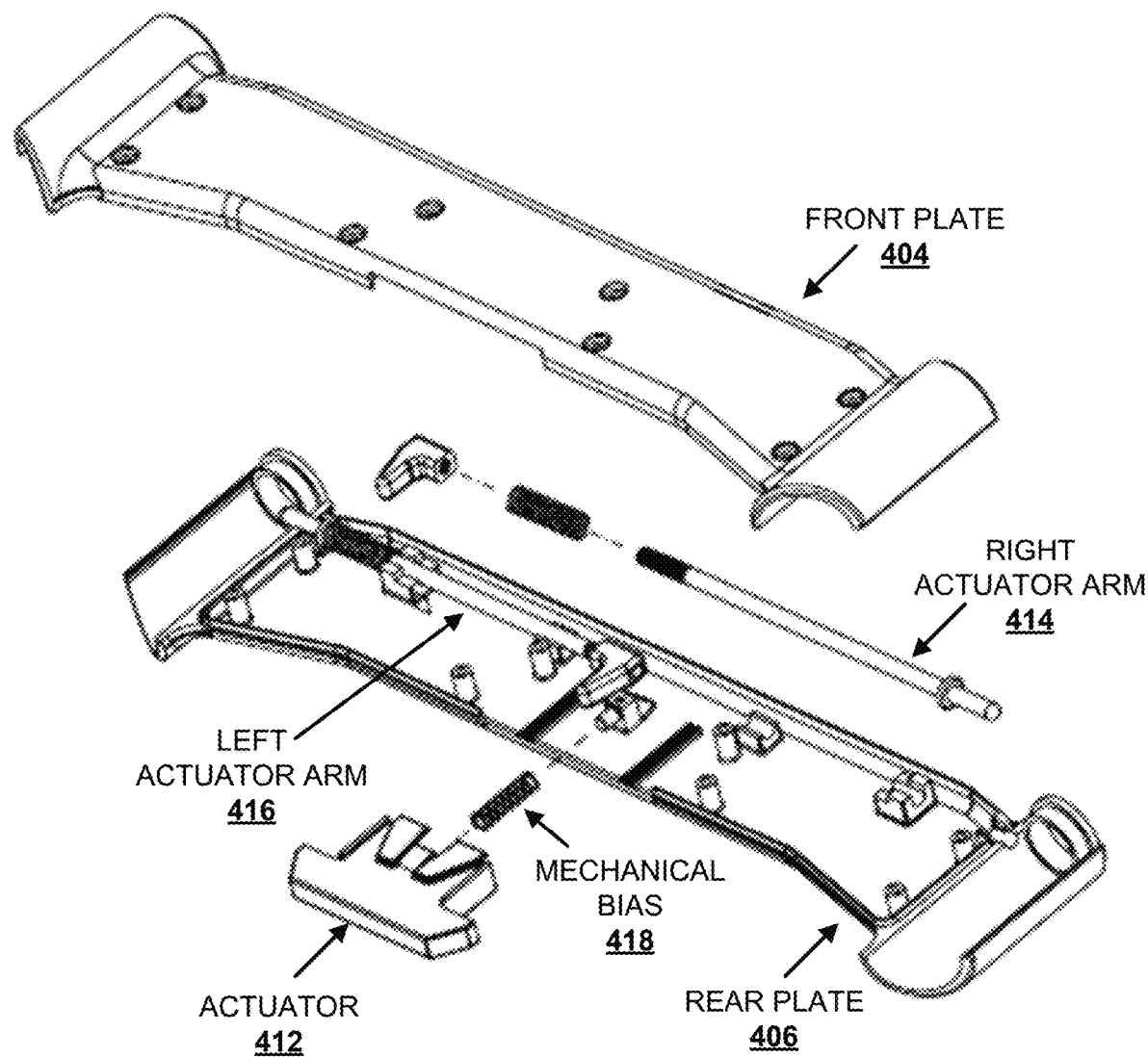
FIG. 4 illustrates an example exploded diagram of a handle extension/retraction and locking mechanism in additional embodiments.

FIG. 4 depicts an example telescoping handle locking mechanism 400 for a turf maintenance apparatus according to alternative or additional embodiments of the present disclosure. Locking mechanism 400 is illustrated in a partially exploded diagram to illustrate interior mechanical components of locking mechanism 400. As such, a front plate 404 is shown separate from a rear plate 406, though when assembly front plate 404 is secured to rear plate 406.

Locking mechanism 400 includes an actuator 412 configured to affect a right actuator arm 414 and a left actuator arm 416 of locking mechanism 400. In the embodiment depicted by FIG. 4, actuator 412 is configured to push right actuator arm 414 and left actuator arm 416 inward toward a center of locking mechanism 400 and away from respective right and left edges of locking mechanism 400 when depressed. In other embodiments, directional movement(s) of the actuator arms can differ from that described (e.g., actuators 414, 416 or differently structured actuators can be pushed outward, lifted upward moved downward, pushed inward, pulled outward, or the like, or a suitable combination), and the mode of activation of actuator 412 can also differ (e.g., pushed in, pulled out, shifted left, shifted right, or the like, or suitable combinations of the foregoing).

In the embodiment depicted by FIG. 4, actuator 412 is activated by pushing inward against a mechanical bias 418. Mechanical bias 418 can be a coil spring, as illustrated, or another suitable mechanical bias such as various types of leaf springs, torsion springs, hydraulic springs, pneumatic (or gas) springs, diaphragms, pressure plate(s), flexible rod(s), shock absorbers, or the like, or a suitable combination of the foregoing. Actuator 412 can be formed with an angled lever and situated with respect to right actuator arm 414 and left actuator arm 416 such that in response to inward motion of actuator 412, right and left actuator arms are displaced inward toward a center of locking mechanism and pulled away from respective edges of locking mechanism 400. Mechanical bias 418 can return actuator 412 to a non-depressed position when the pushing is stopped, and one or more return bias devices can return left and right actuator arms 416, 414 to respective non-displaced positions (e.g., see FIGS. 4-6, infra).

Figure 5A:
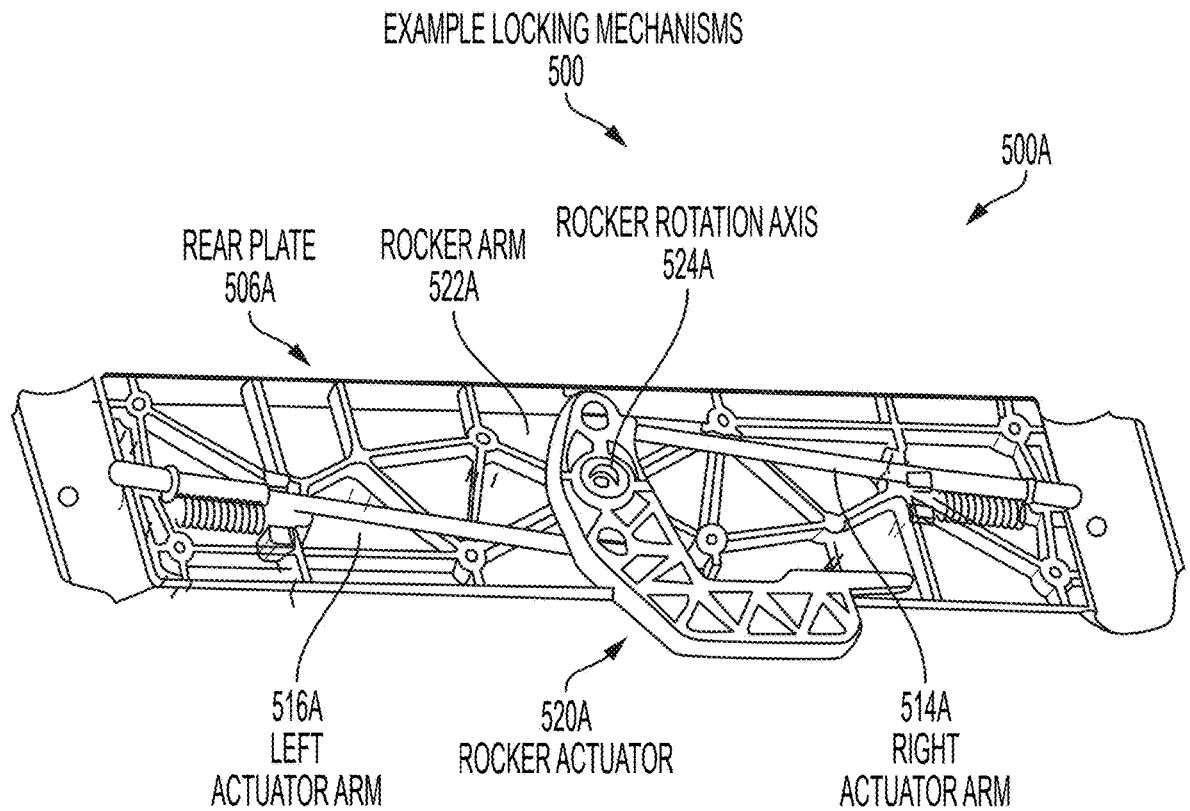
FIGS. 5A and 5B illustrate example interiors of alternative handle extension/retraction and locking mechanisms in other embodiments.
Figure 5B:
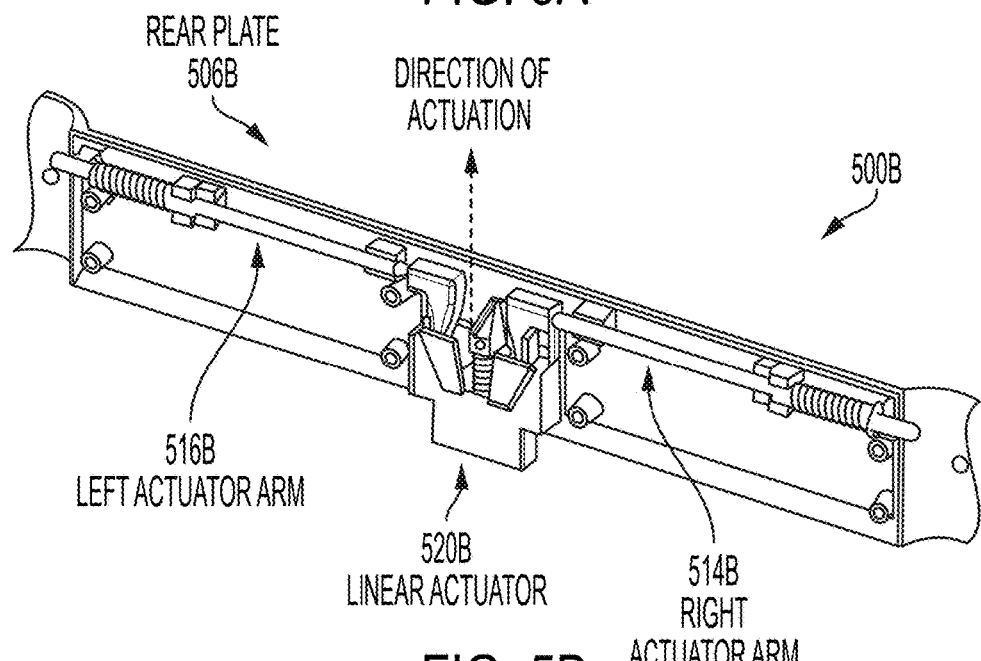

FIGS. 5A and 5B depict example locking mechanism 500A and 500B according to alternative or additional embodiments of the present disclosure. Locking mechanism 500A illustrates a rocker actuator 522A having a rocker arm 522A. When rocker actuator 520A is depressed, rocker arm 522A rotates about a rocker rotation axis 524A. Ends of a right actuator arm 414A and left actuator arm 516A are secured to rocker arm 522A at opposed sides of rocker rotation axis 524A, such that when rocker arm 522 rotates counterclockwise about rocker rotation axis 524A, right and left actuator arms 514A, 516A are both pulled inward toward a center of locking mechanism 500A and pulled away from respective right and left edges of locking mechanism 500A. When rocker actuator 520A rotates clockwise about rocker rotation axis 524A (e.g., in response to operation of a return bias, such as actuator bias springs illustrated on right and left actuator arms 514A and 516A, or a mechanical bias applied to rocker actuator 520A such as depicted or described with respect to mechanical bias 418 of FIG. 4, supra) right and left actuator arms 514A, 516A are pushed outward away from the center of locking mechanism 500A toward right and left edges thereof.

Locking mechanism 500B illustrates a linear actuator 520B. Linear actuator 520B can be mechanically coupled to respective heads of left actuator arm 516B and right actuator arm 514B. The mechanical coupling allows the actuator heads to slide deeper within linear actuator 520B in response to motion of linear actuator 520B further into an interior of locking mechanism 500B than that depicted by FIG. 5B, along the direction of the dashed arrow. In response to this inward motion, actuator heads are displaced toward a center of locking mechanism 500B, pulling their respective ends away from left and right edges of locking mechanism 500B, respectively. A mechanical bias returns linear actuator 520B to its position depicted by FIG. 5B (opposite the inward motion) once an inward force against the mechanical bias stops. Respective actuator bias springs (not depicted, but see FIG. 6, infra) can likewise return left and right actuator arms 516B, 514B to their depicted positions in response to linear actuator 520B returning to its depicted position.

Figure 6:
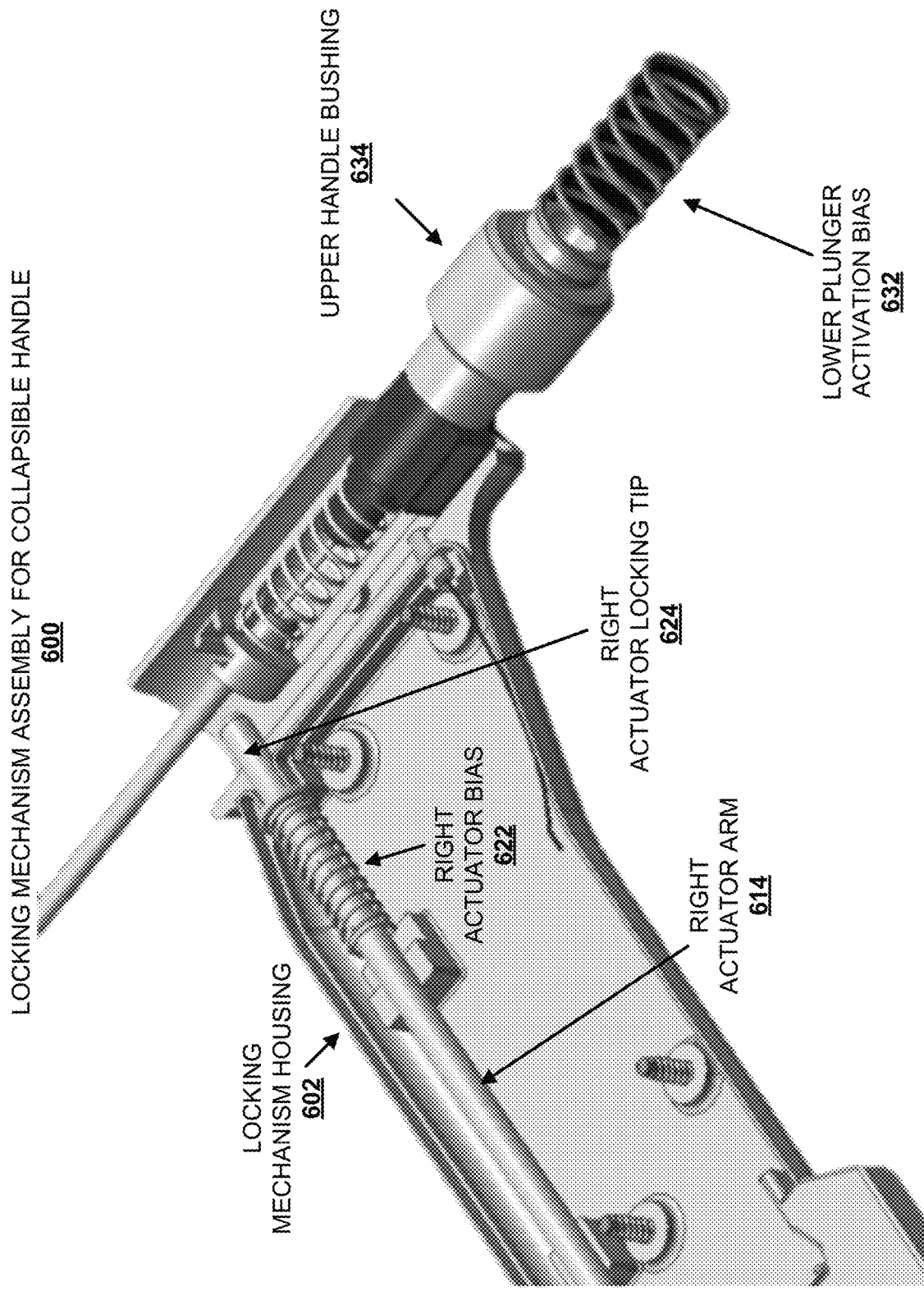
FIG. 6 depicts a sample handle extension/retraction and locking mechanism in further embodiments.

FIG. 6 illustrates a diagram of an example locking mechanism 600 for a collapsible handle according to alternative or additional embodiments of the present disclosure. Locking mechanism 600 illustrates a right actuator arm 614 having a right actuator bias 622. It should be appreciated that locking mechanism 600 can also include a left actuator arm and left actuator bias, as well as left actuator locking tip as depicted throughout this specification, though not explicitly shown in FIG. 6. Operation of such components described hereinbelow for right actuator bias 622, right actuator arm 614 and right actuator locking tip 624 can be equally applicable to corresponding components on the left side of locking mechanism 600.

Right actuator bias 622 is configured to provide a mechanical resistance to movement of right actuator locking tip 624 from its depicted position, and to restore right actuator locking tip 624 to its depicted position in the absence of a larger bias upon right actuator arm 614. For instance, when a larger bias pulling right actuator arm 614 inward to the left of locking mechanism 600 is applied, right actuator locking tip 624 can be retracted within a housing 602 of locking mechanism 600, and clear of respective locking holes in a lower handle and upper handle connected to locking mechanism 600 (e.g., see FIGS. 7-8, infra). When right actuator locking tip 624 is in its depicted position and engaged with respective locking holes in the lower handle and upper handle, right actuator locking tip 624 serves to lock a relative position of the upper handle and lower handle in a place in which the locking holes overlap, or substantially overlap (e.g., sufficiently overlapping such that right actuator locking tip 624 can fit within both locking holes concurrently). In contrast, when right actuator locking top 624 is retracted within housing 602 (and e.g., a left actuator locking tip is retracted within housing 602), the upper handle can be free to slide within the lower handle. Sliding the upper handle within the lower handle serves to dis-align the locking holes, such that the exterior surface of the upper handle restricts right actuator locking tip 624 from returning to its depicted position despite a return force applied by right actuator bias 622. Right actuator bias 622 can maintain this return force while the locking holes are dis-aligned.

In addition to the foregoing, locking mechanism 600 can operate to re-lock the upper handle relative to the lower handle in response to the locking holes of the upper handle and lower handle returning to an overlapping position. This occurs in response to the pressure supplied by right actuator bias 622 on an outer surface of the upper handle. This pressure further pushes right actuator locking tip through the locking hole in the upper handle, preventing further movement of the upper handle and thus re-locking the upper handle relative the lower handle.

In one or more additional embodiments, movement of the upper handle can serve to move an upper handle bushing 634 and associated lower plunger activation bias 632. When the upper handle is slid downward further into the lower handle, upper handle bushing 634 and lower plunger activation bias 632 can be operable to contact and release a lower plunger from a locked position relative a base plunger (e.g., see FIG. 9, infra). This can serve to unlock a lower portion of the handles from the base plunger as described herein.

Figure 7:
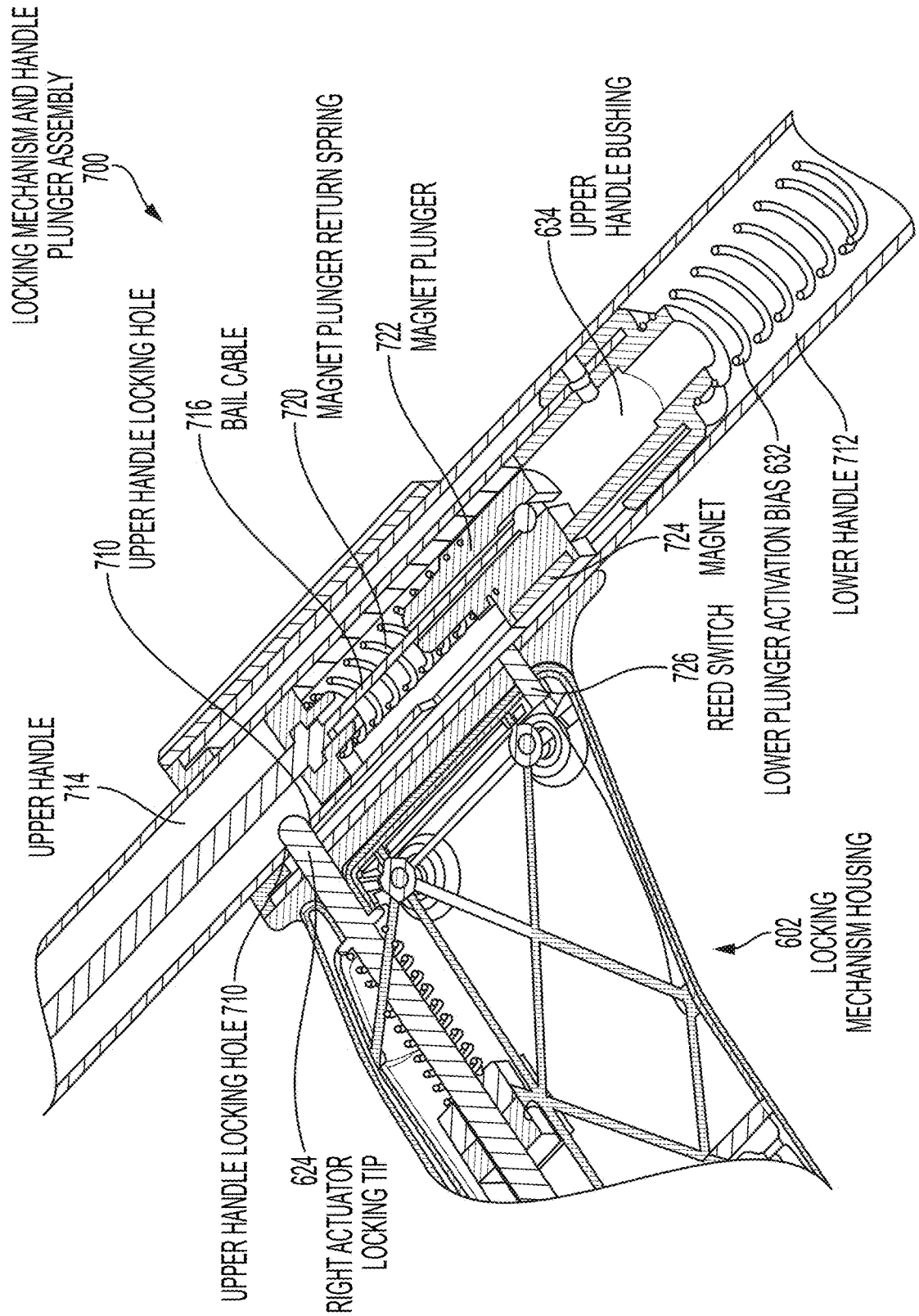
FIG. 7 illustrates a sample handle extension/retraction and locking mechanism in still additional embodiments of the present disclosure.

FIG. 7 illustrates alternative or additional embodiments of locking mechanism 600, discussed above, including an upper handle plunger assembly 700. FIG. 7 illustrates upper handle 714 movably situated with respect to lower handle 712. In other embodiments, locking mechanism 600 and upper handle plunger assembly 700 can be reconfigured such that upper handle 714 has a different spatial orientation with respect to lower handle 712 (e.g., upper handle 714 has a larger diameter than lower handle 712, and lower handle 712 fits within upper handle 714, or other suitable arrangement). In the embodiment illustrated by FIG. 7, upper handle 714 is secured to an upper handle bushing 634 that seats upper handle 714 conformally within an interior of lower handle 712. An upper handle locking hole 710 illustrates right actuator locking tip 624 seated through upper handle locking hole 710, thereby fixing a position of upper handle 714 relative to lower handle 712 (and relative to housing 602).

When right actuator locking tip 624 is withdrawn from upper handle locking hole 710, upper handle 714 can slide within lower handle 712. Upper handle bushing 634 guides upper handle 714 smoothly along a center of lower handle 712, and also pushes a lower plunger activation bias in front of upper handle 714. Upper handle plunger assembly 700 can also include a bail cable 716 secured within upper handle 714 and attached to a magnet plunger 722 housing a magnet 724. When upper handle 714 is pulled upward and out of lower handle 712, bail cable 716 pulls magnet plunger 722 upward as well, so that when upper handle 714 is in a locked extended position (with upper handle locking hole 710 seating right actuator locking tip 624), magnet 724 is near a reed switch 726. Reed switch 726 can be connected to a motor deactivation circuit, that prevents operation of a motor of turf maintenance apparatus 100 when reed switch 726 is not magnetically activated by magnet 724 (e.g., when magnet 724 is too far away from reed switch 726, which can include the position shown in FIG. 7 in at least some disclosed embodiments). Magnet 724 is aligned with reed switch 726 only when two conditions occur: when upper handle 714 is in the locked extended position and when the bail cable 716 pulls the magnet plunger 722 upward within upper handle 714, adjacent to reed switch 726. Bail cable 716 can be connected to an operator presence cable (e.g., see FIG. 15A, infra, operator presence cable 1504) such that when the operator presence cable is engaged (e.g., pressed against hand grip 306 of FIG. 3, supra) a force upon the bail cable 716 is exerted pulling magnet plunger 722 and magnet 724 adjacent to reed switch 726. In response to magnet plunger 722 and magnet 724 being properly situated with respect to reed switch 726 the motor deactivation circuit is disabled and operation of the motor of turf maintenance apparatus 100 is allowed.

Figure 8:
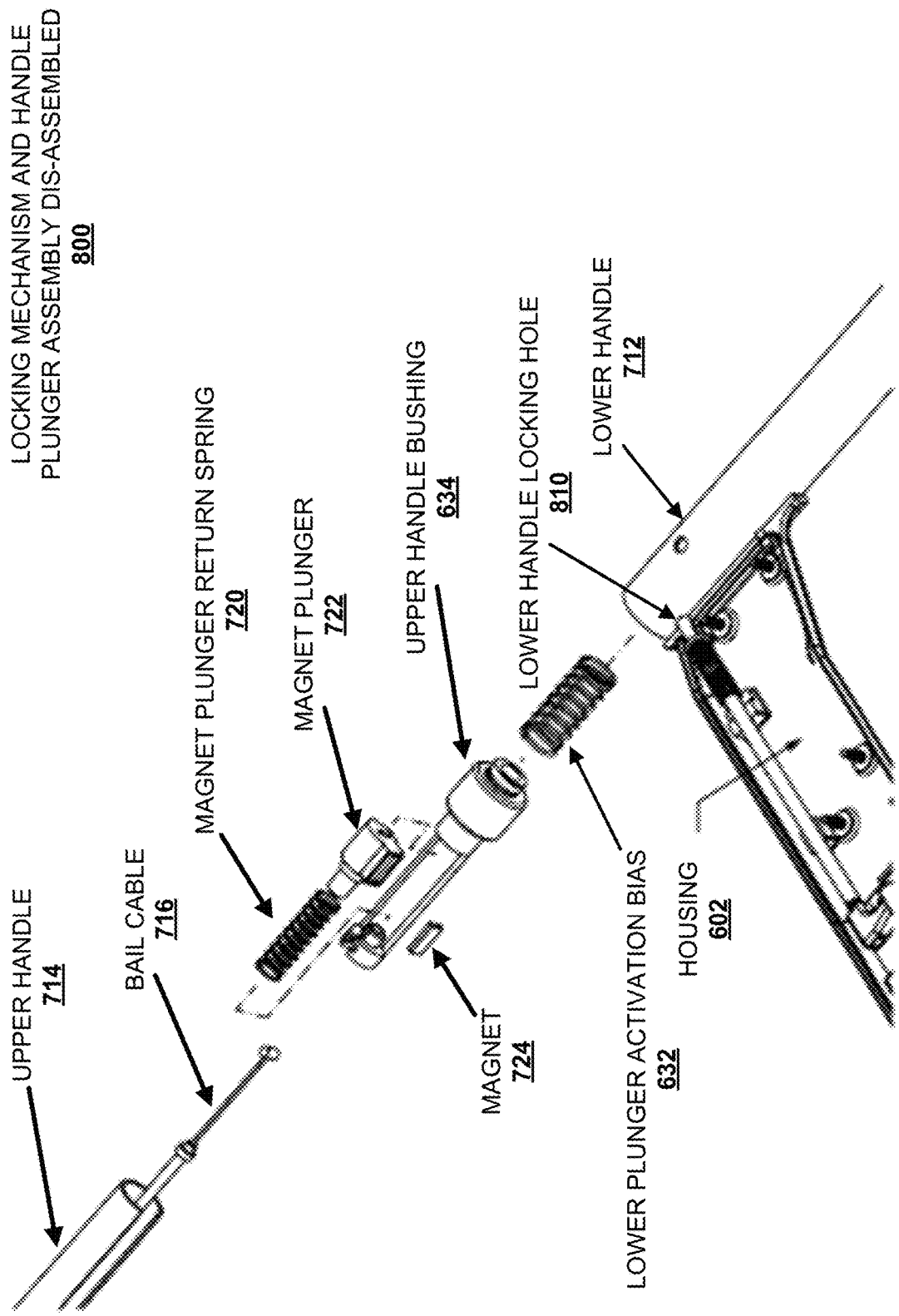
FIG. 8 depicts an exploded diagram view of an upper interior locking mechanism for collapsible handles of a turf maintenance apparatus, in various embodiments.

FIG. 8 illustrates an example exploded part view of handle plunger assembly 700 according to various embodiments. Upper handle 714 is shown extended away from lower handle 712 and housing 602 of locking mechanism 600. The exploded part view illustrates a lower handle locking hole 810 on an exterior of lower handle 712, in which the right locking actuator tip is positioned. With upper handle 714 lifted away, the inner bail cable 716 is depicted, and relative positions of magnet plunger 722 and a magnet plunger return spring 720 within a carriage of upper handle bushing 634 are shown. Magnet plunger return spring 720 can provide an opposing force to bail cable 716, so as to maintain (or return) magnet plunger 722 adjacent to upper handle bushing 634 in response to an upward force by bail cable 634 on magnet plunger 722. Magnet 724 is also shown separate from magnet plunger 722, and lower plunger activation bias 632 is shown separated from upper handle bushing 634.

Figure 9:
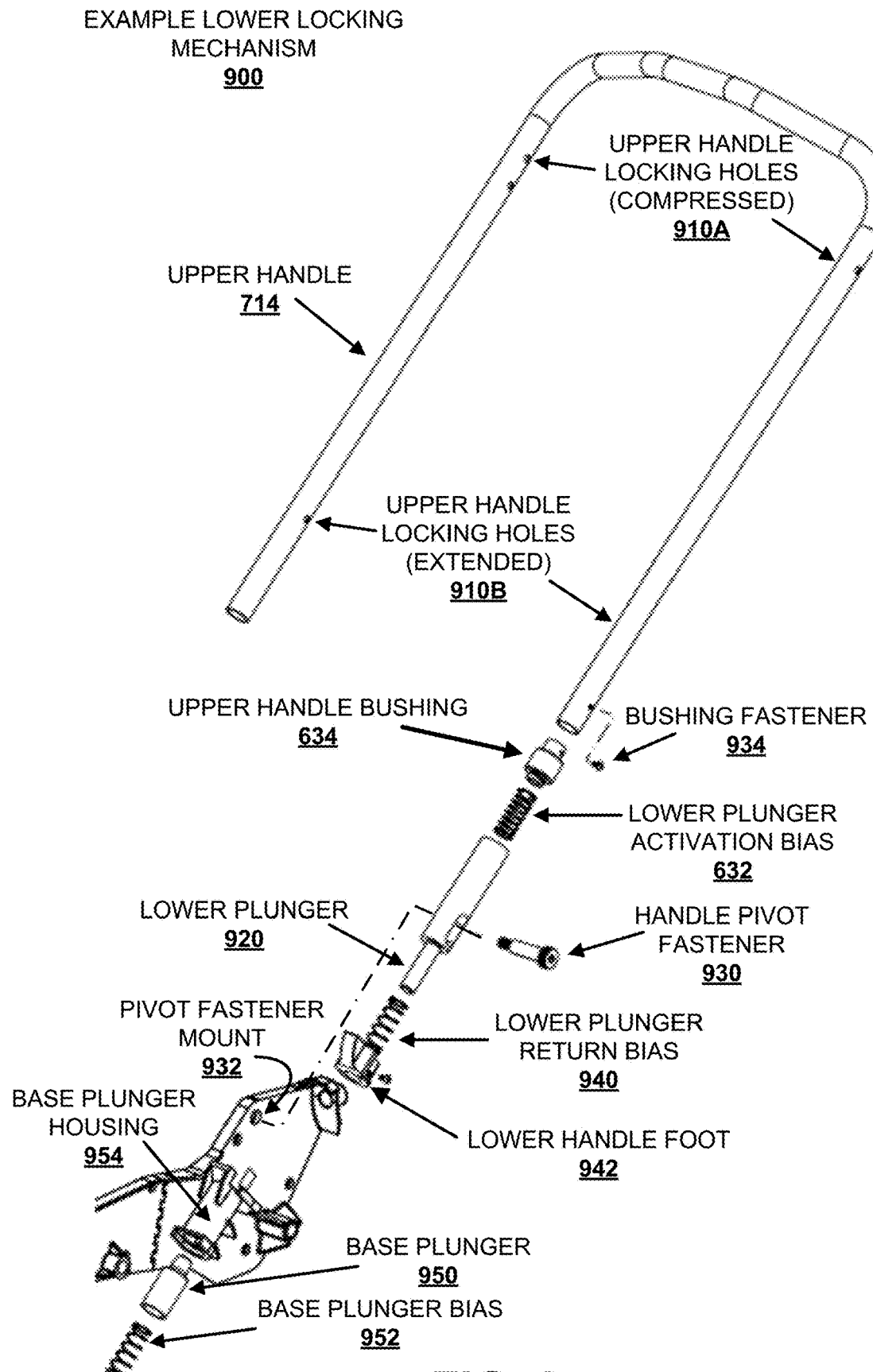
FIG. 9 depicts an exploded diagram view of a lower interior locking mechanism for collapsible handles of a turf maintenance apparatus, in further embodiments.

FIG. 9 depicts an example lower locking mechanism 900 for a collapsible and foldable handle arrangement according to still other embodiments of the present disclosure. Lower locking mechanism 900 is illustrated with lower handle 712 not visible, and components within lower handle 712 in a partial exploded part diagram. Such components, normally at least in part housed within lower handle 712 include a lower plunger 920, lower plunge return bias 940 and a handle pivot fastener 930. Further, a lower handle foot 942 can be secured to the lower handle 712.

In addition, upper handle 712 is illustrated having multiple pairs (left and right) of locking holes, including upper handle locking holes (extended) 910B and upper handle locking holes (compressed) 910A. Upper handle locking holes (extended) 910B are configured to lock upper handle 714 relative to lower handle 712 when upper handle 714 is in an extended position, and most of upper handle 714 is pulled upward and outward from lower handle 712. Upper handle locking holes (extended) 910B are spatially overlapping with corresponding lower handle locking holes 810 when upper handle 714 is in this extended position. In contrast, upper handle 714 can be in a collapsed (or compressed) position, with most of upper handle 714 pushed downward and into lower handle 712. Upper handle locking holes (compressed) 910A are spatially overlapping with corresponding lower handle locking holes 810 in this latter position. Similar to that described at FIGS. 5-8, supra, left and right actuator locking tips can extend through upper handle locking holes (compressed) 910A and lower handle locking holes 810 when upper handle 714 is in the collapsed/compressed position. In various embodiments, one or more pairs of intermediate locking holes can be provided between upper handle locking holes (compressed) 910A and upper handle locking holes (extended) 910B to lock upper handle 714 and lower handle 712 at one or more respective positions between the extended and collapsed positions.

When assembled, lower plunger 920 and handle pivot fastener 930 are positioned relative to base plunger housing 954 such that handle pivot fastener 920 situated within a slide opening of lower plunger 920 is mounted to a pivot fastener mount 932 above base plunger housing 954. A base plunger 950 can extend in part upward through base plunger housing 954 to sit within an opening of a lower handle foot 942 secured to lower handle 712. When seated within the opening of the lower handle foot 942, base plunger 950 can effectively secure lower handle 712 to base plunger housing 954. With base plunger housing 954 secured to a mow body 104 of turf maintenance apparatus 100 (or a frame 232 of turf maintenance apparatus 200), a force upon the lower handle 712 (e.g., originating at 306 of upper handle 714) translates to the mow body 104 or frame 232. Depending on the direction of the force then, the lower handle 712 can push the turf maintenance forward, pull the turf maintenance backward, or even pivoting the turf maintenance apparatus backward about its rear wheels (or tipping the turf maintenance apparatus forward over its front wheels), and so forth.

In response to upper handle 714 being pushed downward into lower handle 712, lower plunger activation bias 632 pushes upon a rear of lower plunger 920. This causes a bottom pin portion of lower plunger 920 to extend through the opening of lower handle foot 942 from a top side of lower handle foot 942 (e.g., see FIG. 10, infra). In turn, the bottom pin portion of lower plunger 920 can push base plunger 950 out of the opening of lower handle foot 942, effectively unlocking lower handle foot 942 from base plunger housing 954. To accomplish this, lower plunger activation bias 632 can have stronger mechanical bias than lower plunger return bias 940 and base plunger bias 952, to enable a force on lower plunger 920 by upper handle bushing 634 to overcome the lower plunger return bias 940 and the base plunger bias 952. Once base plunger 950 is pushed out of the opening in lower handle foot 942 by lower plunger 920, lower handle 712 is free to rotate about handle pivot fastener 930 (e.g., see FIGS. 10-11, infra). Moreover, locking mechanism 600 can be configured to lock upper handle 714 in the compressed position (e.g., by way of upper handle locking holes (compressed) 910A) to maintain the force supplied by lower plunger activation bias 632 on lower plunger 920, and in turn on base plunger 950. Thus, while locking mechanism 600 locks upper handle 714 in the compressed position, lower handle 712 can rotate about handle pivot fastener 930. When locking mechanism 600 unlocks upper handle 714 from the compressed position (and no downward force is supplied on upper handle 714 sufficient to overcome lower plunger return bias 940), the bottom pin portion of lower plunger 920 can be returned upward to (or beyond) the opening of lower handle foot 942, allowing the opening in lower handle foot 942 to re-engage base plunger 950, as an example (if lower handle 712 and the opening in lower handle foot 942 are aligned over the base plunger).

Figure 10:
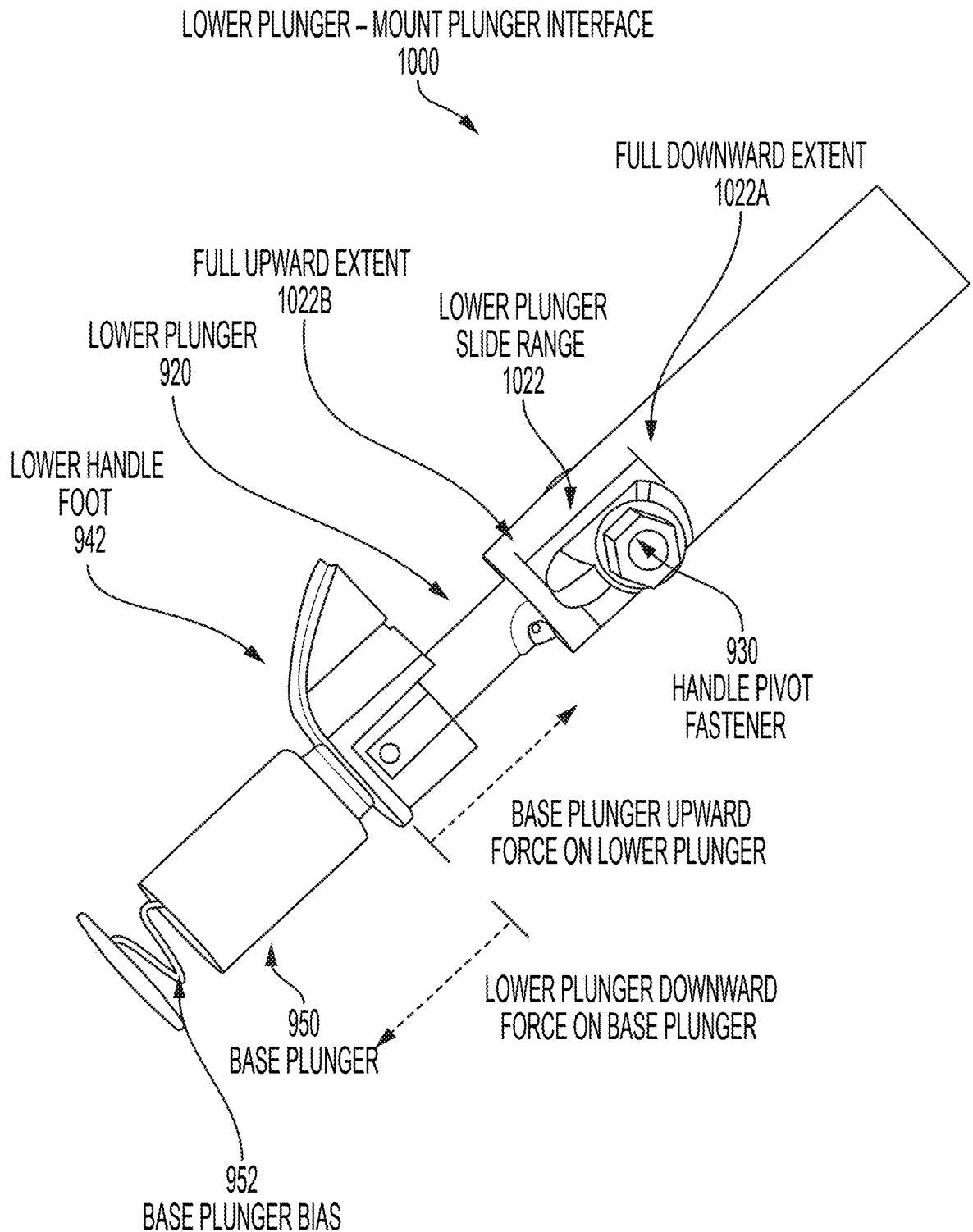
FIG. 10 illustrates an example lower locking and unlocking mechanism for a collapsible and foldable handle according to other embodiments.

FIG. 10 depicts an example diagram of the lower plunger-base plunger interface 1000 according to one or more embodiments of the present disclosure. FIG. 10 more clearly illustrates a lower plunger slide range 1022 in which handle pivot fastener 930 is seated. Lower plunger slide range 1022 allows lower plunger 920 to slide relative to handle pivot fastener 930 (and relative lower handle 712) between a full downward extent 1022A and a full upward extent 1022B. At full downward extent 1022A, lower plunger pushes base plunger 950 out of the opening in lower handle foot 942, thereby clearing lower handle foot 942 from base plunger 950 and allowing lower handle 712 to rotate about handle pivot fastener 930. In contrast, at full upward extent 1022B, base plunger bias 952 pushes base plunger into the opening in lower handle foot 942, thereby locking lower handle foot 942 and lower handle 712 at base plunger housing 954 and preventing rotation about handle pivot fastener 930. Thus, at lower plunger-base plunger interface 1000, base plunger bias 952 and base plunger 950 provide an upward force on lower plunger 920, and lower plunger activation bias 632 and lower plunger 920 can provide a downward force on base plunger 950. When force by lower plunger activation bias 632 overcomes base plunger bias 952, base plunger 950 is pushed out from lower handle foot 942 by lower plunger 920, freeing lower handle foot 942 from base plunger housing 954. Where force by base plunger bias 952 exceeds that of lower plunger activation bias 632 (and lower handle foot 942 is aligned with base plunger 950), base plunger can return through the opening in lower handle foot 942 thereby securing lower handle foot 942 to base plunger housing 954.

Figure 11:
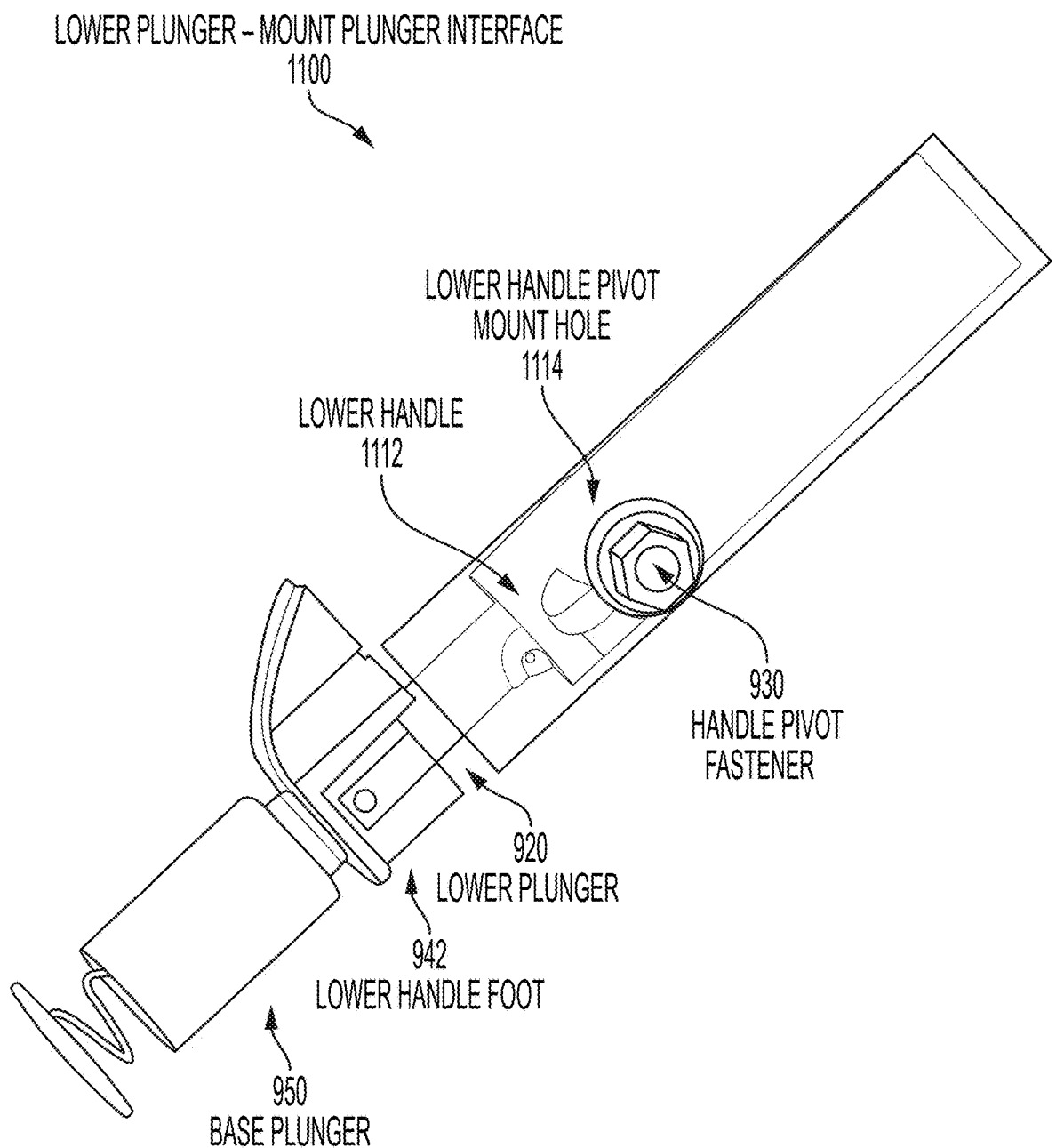
FIG. 11 depicts the example lower locking and unlocking mechanism within a lower handle structure, according to further embodiments.

FIG. 11 illustrates lower plunger-base plunger interface 1100 with a lower handle 1112 positioned over lower plunger 920. A fixed lower handle pivot mount hole 1114 within lower handle 1112 allows handle pivot fastener 930 to extend through lower handle pivot mount hole 1114 and lower plunger slide range 1022. Handle pivot fastener 930 can then secure to pivot fastener mount 932 located in a frame (232) or mow body (104) of a turf maintenance apparatus, or located on a suitable mounting plate that is then secured to the turf maintenance apparatus. This in turn secures lower handle 1112 and lower plunger 920 to the turf maintenance apparatus.

In one or more embodiments, fixed lower handle pivot mount hole 1114 can have a diameter only marginally larger than a corresponding diameter of handle pivot fastener 930. These relative diameters can be selected to allow lower handle 1112 to rotate about handle pivot fastener 930, but not to translate (or significantly translate) about handle pivot fastener 930. Thus, lower handle 1112 can serve as a secure fastening point for collapsible and foldable handles 102 to mower body 104 (or frame 232). In an embodiment, handle pivot fastener 930 can have a countersunk portion (not depicted) that seats partially within lower handle pivot mount hole 1114 to minimize translation movement between lower handle 1112 and lower handle pivot mount hole 1114, although the present disclosure is not limited to such embodiment. In contrast, lower plunger slide range 1022 permits translation of lower plunger 920 within lower handle 1112 and about handle pivot fastener 930 to permit the motion of lower plunger 920 described herein that facilitates locking lower handle 1112 to base plunger housing 954 and disengaging lower handle 1112 from base plunger housing 954. Both lower plunger slide range 1022 and lower handle pivot mount hole 1114 permit rotation of lower handle 1112 about handle pivot fastener 930 in response to lower handle foot 942 being unlocked from base plunger housing 954, as described herein.

Figure 12:
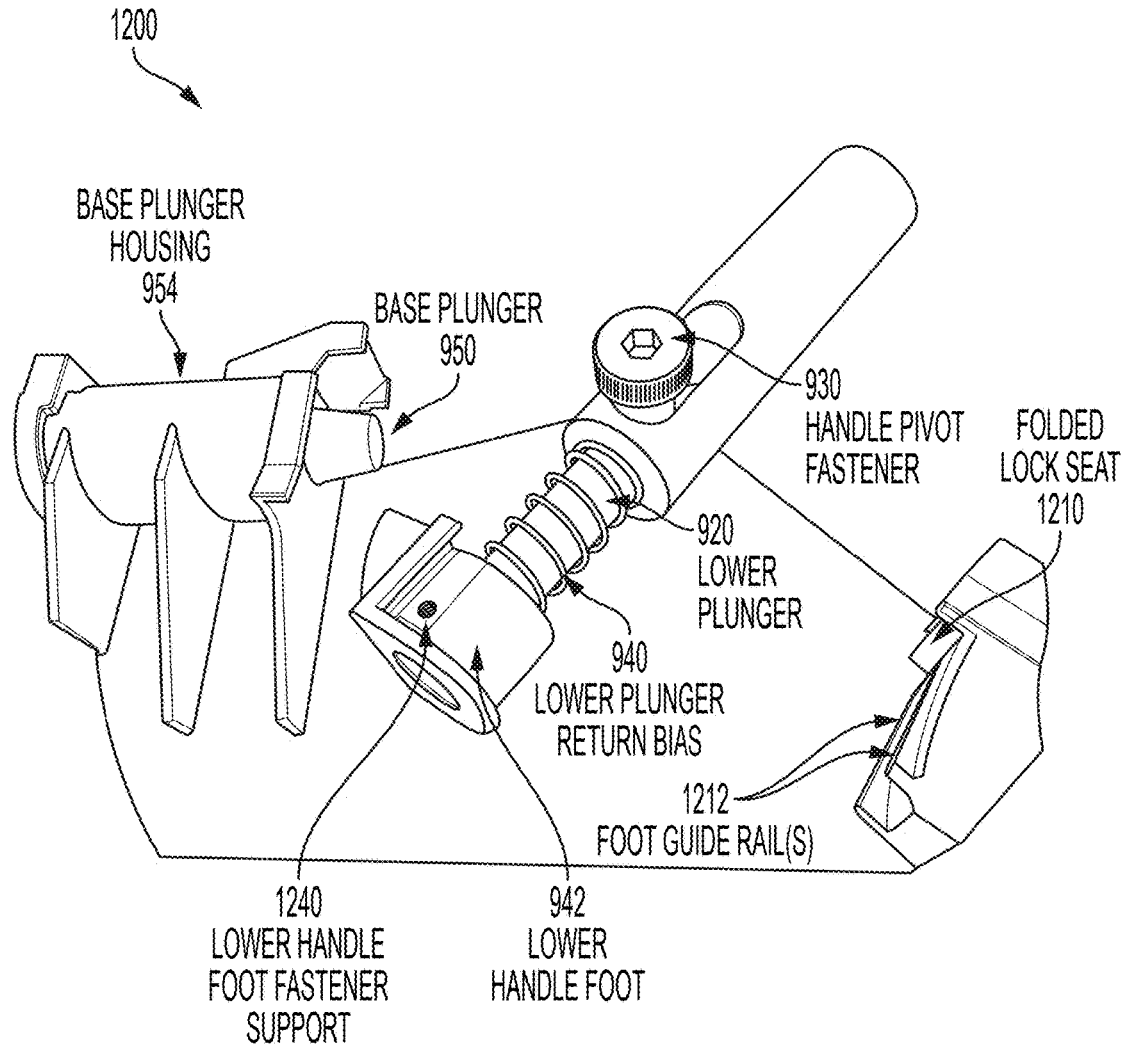
FIG. 12 depicts a handle locking mechanism for extended and folded positions in an embodiment(s).

FIG. 12 provides a picture of an example lower handle rotation 1200 between a base plunger housing 954 and folded lock seat 1210, according to one or more embodiments of the present disclosure. Example lower handle rotation 1200 depicts lower plunger 920 without the lower handle (e.g., lower handle 712 as depicted in FIG. 7 or lower handle 1112 as depicted in FIG. 11) for conceptual illustration. In general, lower handle 1112 can be secured to lower handle foot 942 at lower handle foot fastener support 1240, housing lower plunger 920 and secured to handle pivot fastener 930 is described above at FIG. 11, supra. A lower plunger return bias 940 is provided seated over a bottom pin portion of lower plunger 920. Lower plunger return bias 940 provides an upward force against lower plunger 920 (e.g., when lower handle foot 942 is secured to lower handle 1112), and lower plunger activation bias 632, as described herein.

When unlocked from base plunger 950 and base plunger housing 954, lower plunger 920 is free to rotate between base plunger housing 954 and folded lock seat 1210. With upper handle 714 compressed within lower handle 1112, lower plunger activation bias 632 maintains downward force on lower plunger 920 causing the bottom pin portion of lower plunger 920 to remain situated through the opening in lower handle foot 942. When approaching folded lock seat 1210, foot guide rail(s) 1212 guide the bottom pin of lower plunger 920 to a folded lock seat hole (see FIG. 13, infra) when lower handle 1112 is rotated into folded lock seat 1210. Foot guide rail(s) 1212 can also guide the bottom pin of lower plunger 920 to rotate away from folded lock seat 1210 when lower plunger 920 is released from the folded lock seat 1210 (see below). Additionally, a surface of folded lock seat 1210 is configured to push the lower plunger 920 upward within lower handle 1112 as lower handle 1112 is rotated from a front of folded lock seat 1210 to a rear of folded lock seat 1210. Conversely, the folded lock seat 1210 surface releases the lower plunger 920 as lower handle 1112 rotates from the rear of folded lock seat 1210 to the front of folded lock seat 1210.

Figure 13:
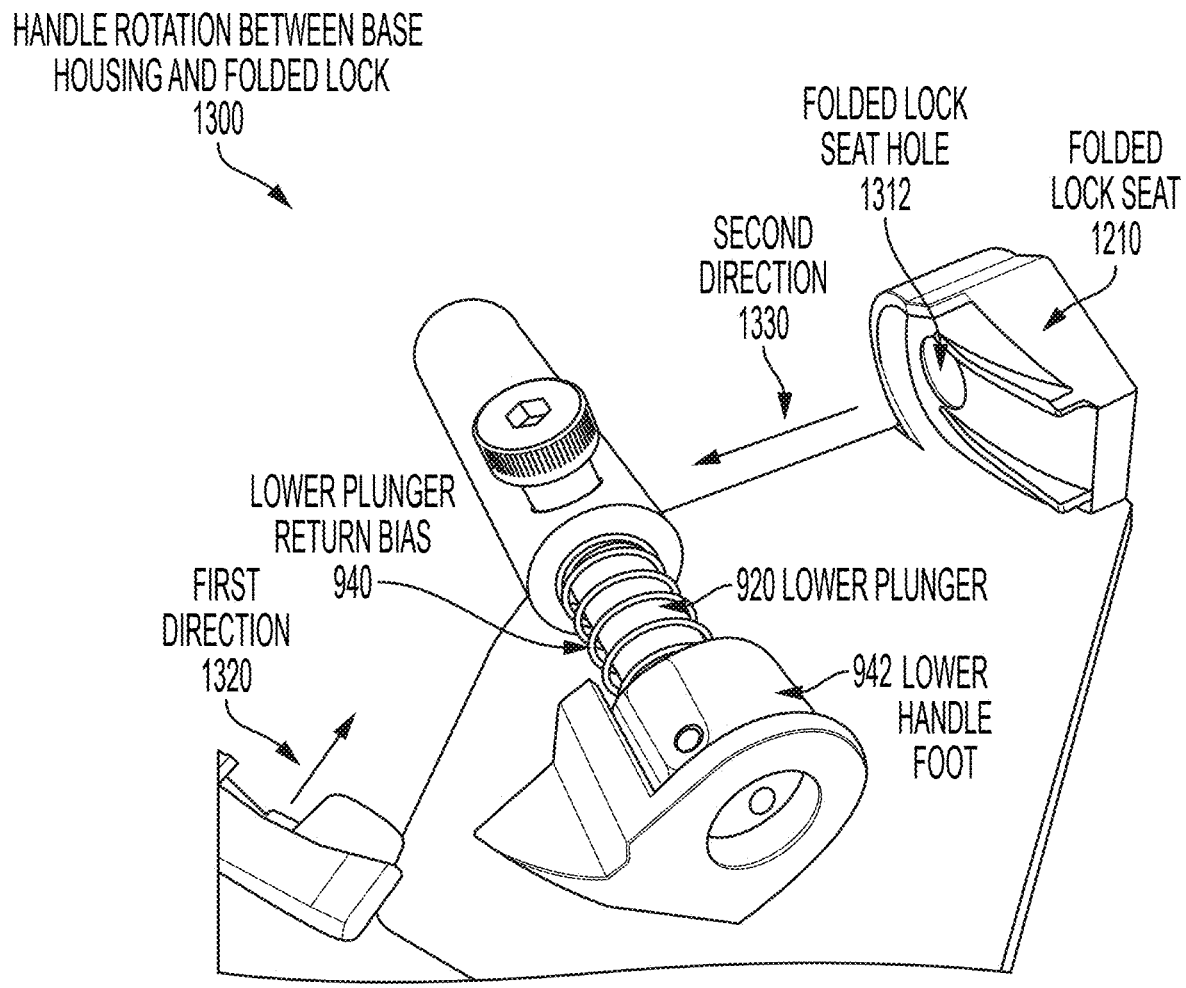
FIG. 13 depicts the handle locking mechanism for extended and folded positions, in additional embodiments.

FIG. 13 illustrates folded lock seat 1210 including a folded lock seat hole 1312. The folded lock seat hole 1312 provides an opening in which the bottom pin of lower plunger 920 can sit, when lower handle 1112 and lower plunger 940 are rotated into folded lock seat 1210 so that the bottom pin of lower plunger 920 clears the surface of folded lock seat 1210 and is adjacent folded lock seat hole 1312. With upper handle locking holes (compressed) 910A locked by right (and left) actuator locking tip 624, mechanical pressure is maintained by lower plunger activation bias 632 on lower plunger 920, and thus the bottom pin of lower plunger 920 within folded lock seat hole 1312. This serves to lock lower plunger 920 into folded lock seat 1210, and similarly locks collapsed and folded handles 202 in the folded position as illustrated in FIG. 2, supra. Upon depressing actuator 412 (or actuators 520A, 520B) of locking mechanism 600, right (and left) actuator locking tip 624 is pulled within locking mechanism 600 releasing upper handle 714 from upper handle locking holes (compressed) 910A, and thereby removing the mechanical pressure from lower plunger activation bias 632. This allows lower plunger return bias 940 to push the bottom pin of lower plunger 920 up out of folded lock seat hole 1312, freeing lower handle foot 942 (and lower handle 1112) from folded lock seat 1210. Lower handle 1112 is then free again to rotate between folded lock seat 1210 and base plunger housing 954, and to lock into either position.

Base housing 954 can have a seat (or surface) in which a bottom surface of lower handle foot 942 is situated when lower handle 1112 is in the extended position. The seat of base housing 954 can extend in a first direction 1320. Additionally, folded lock seat 1210 can have a second seat (or surface) in which the bottom surface of lower handle foot 942 is situated when lower handle 1112 is in the folded position. The seat of folded lock seat 1210 can extend in a second direction 1330. A difference between the first direction 1320 and second direction 1330 can be an angle of rotation of lower handle 1112 when secured by handle pivot fastener 930 to pivot fastener mount 932, in various embodiments. The difference can be an angle greater than ninety degrees, in an embodiment. The difference can be an angle between about ninety degrees and one hundred and eighty degrees in another embodiment, or any suitable value or sub-range there between in yet another embodiment. In still further embodiments, the angle can be an angle between about forty-five degrees and about two hundred seventy degrees, or any suitable value or sub-range there between.

Figure 14:
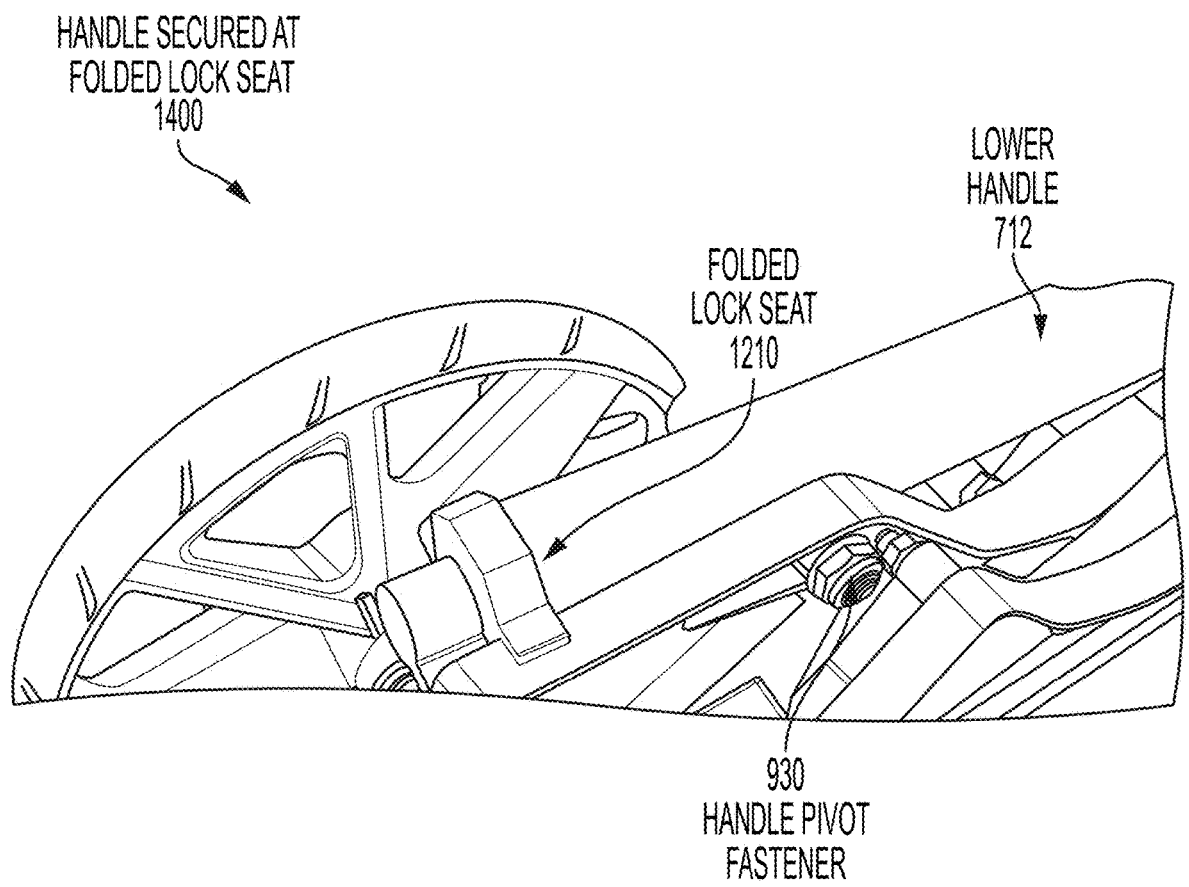
FIG. 14 depicts folded handles locked by the handle locking mechanism according to further disclosed embodiments.

FIG. 14 provides a top-down view of lower handle 712 secured into folded lock seat 1210. In an embodiment, FIG. 14 can be a top-down view of turf maintenance apparatus 210 in compact position 200 of FIG. 2, supra. The bottom pin of lower plunger 920 within lower handle 712 is secured in folded lock seat hole 1312 of folded lock seat 1210. This allows collapsed and folded handles 202 to lock into the folded position. Accordingly, a disclosed turf maintenance apparatus 100, 210 can be stored with collapsed and folded handles 202 locked at the folded lock seat 1210, allowing the apparatus to be suspended from a wall by the handles, or situated vertically along the base of a wall, or other compact storage position.

FIGS. 15A and 15B depict alternative or additional operator presence device embodiments 1500 according to one or more further aspects of the present disclosure. In an embodiment(s), the operator presence devices illustrated in FIGS. 15A and 15B can be implemented in conjunction with reed switch 726 and magnet 724 of FIG. 7, infra. In other words, operation or starting of an engine or motor of a disclosed turf maintenance apparatus can be prevented absent magnet 724 being in a predefined position with respect to reed switch 726 (e.g., handles in a locked and extended operator position) in combination with an operator presence device(s) being activated as described below.

FIG. 15A illustrates an activator 1506A mechanically secured to an operator presence cable (OPC) 1504. An activator receptor 1508A situated at a center of a hand grip 1502 opposite the activator 1506A is configured to detect the activator 1506A when OPC is compressed flush to or substantially flush to hand grip 1502. When detecting activator 1506A, activator receptor 1508A can close an electric circuit that permits a motor, engine or the like to be operated or started. When OPC 1504 is moved away from user grip 1502, activator receptor 1508A loses detection of activator 1506A and the electric circuit is opened, preventing the motor, engine, etc. from being operated or started. FIG. 15B illustrates an alternative embodiment having an activator 1506B suspended or otherwise movably secured to OPC 1504, and an activator receptor 1508B also secured to OPC 1504. In an embodiment, activator receptor 1508B can be fixedly secured to OPC 1504, whereas in other embodiments activator receptor 1508B can be slidably secured along OPC 1504. In response to a user inserting activator 1506B into a receptor slot within activator receptor 1508B, activator receptor 1508B can close the electric circuit permitting the motor or engine to be operated or started. When activator 1506B is removed from the receptor slot within activator receptor 1508B, the electric circuit is opened and the motor or engine is prevented from being started or operated. Other arrangements of an activator 1506A, B or activator receptor 1508A, B understood in the art or reasonably conveyed to one of ordinary skill in the art by way of the context provided herein is considered within the scope of the present disclosure.

As utilized herein, relative terms and terms of degree including the term "about", "approximately", "near" and others when utilized to modify a numerical description of a disclosed structure, imply a suitable range about the given number. Any implied range is intended to be consistent with and achieve the same or similar functions as described for the disclosed structure given the numerical description, where applicable. Where such ranges are not explicitly disclosed, a range within typical manufacturing tolerances understood by one of ordinary skill in the art can be implied. Alternatively, a range of between 1 and 5% or between 1 and 10% the stated number can be implied, in some embodiments, or a range that would be understood by one of ordinary skill in the art to be suitable to achieve the stated functions and characteristics of the disclosed structure can be implied in other embodiments. Relative terms utilized for qualitative (rather than quantitative) description can be understood to imply explicitly stated alternatives or variations, variations understood in the art to occur from manufacturing tolerances or variations in a manufacturing process, variations understood in the art to achieve the function or purpose described for a particular component or process, or a suitable combination of the foregoing.

In regard to the various functions performed by the above described components, machines, devices, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. Moreover, embodiments described in a particular drawing or group of drawings should not be limited to those illustrations. Rather, any suitable combination or subset of elements from one drawing(s) can be applied to other embodiments in other drawings where suitable to one of ordinary skill in the art to accomplish objectives disclosed herein, known in the art, or reasonably conveyed to one of ordinary skill in the art by way of the context provided in this specification. Where utilized, block diagrams of the disclosed embodiments or flow charts are grouped for ease of understanding. However, it should be understood that combinations of blocks, additions of new blocks, re-arrangement of blocks, and the like are contemplated in alternative embodiments of the present disclosure.

Based on the foregoing it should be understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A walk-behind grass mowing apparatus, comprising:
   a mow deck formed within or secured to a support structure;
   at least one front wheel and at least one rear wheel secured to the support structure;
   a plurality of blades rotatably secured within the mow deck;
   a prime mover secured to the support structure and, when activated, providing mechanical force to the plurality of blades; and
   an operator handle secured to the support structure by a fastener at a rotation axis, wherein the fastener facilitates rotation of the operator handle between an extended position and a folded position and prevents translation of the operator handle away from the rotation axis, the operator handle further comprises a locking mechanism and an actuator, the locking mechanism including a lower locking mechanism and an operator handle locking mechanism, wherein:
     the extended position orients the operator handle at a position above and behind the mow deck,
     the extended position is configured to lengthen to a fully extended position and shorten to a compressed position,
     in a fully compressed position of the extended position an upper handle portion of the operator handle is locked relative a lower handle portion by the operator handle locking mechanism and is unlocked from the fully compressed position in response to activation of the actuator, in the compressed position the operator handle is configured to rotate between the folded position and the extended position, and in the folded position the operator handle is locked in the folded position on a top surface of the frame via the lower locking mechanism positioned at least in part near the rotation axis of the operator handle, and is unlocked from the folded position in response to activation of the actuator.

2. The walk-behind grass mowing apparatus of claim 1, wherein the prime mover is an electric motor powered by a battery removably connected to the support structure.

3. The walk-behind grass mowing apparatus of claim 1, wherein the prime mover is a combustion engine.

4. The walk-behind grass mowing apparatus of claim 1, further comprising a first operator presence device coupled to a first circuit, wherein the first circuit, when abled, prevents operation of the prime mover, and further wherein the operator handle is in the fully extended position the operator presence device disables the first circuit.

5. The walk-behind grass mowing apparatus of claim 4, further comprising:

a second operator presence device proximate a user grip of the operator handle; and a second circuit that, when abled, prevents operation of the prime mover, and wherein the second operator presence device is activated by an operator and disables the second circuit, and in response to both the first circuit and the second circuit being disabled, the prime mover is configured to be activated.

6. The walk-behind grass mowing apparatus of claim 1, wherein in the folded position the operator handle fits within a volume defined by diameters of the at least one front wheel and the at least one rear wheel.

7. The walk-behind grass mowing apparatus of claim 1, wherein:

the lower handle portion comprising a lower plunger and a lower handle foot;

the upper handle portion comprising a lower plunger activation bias;

wherein the lower locking mechanism is further configured for locking the lower handle foot and the lower handle portion of the operator handle in the extended position; and in response to being released from the fully extended position the upper handle portion is configured to be pushed downward relative the lower handle portion causing the lower plunger activation bias to engage and actuate the lower plunger, and in response to the lower plunger being actuated the lower handle foot is unlocked from the lower locking mechanism allowing the upper handle and the lower handle to rotate between the extended position and the folded position.

8. The walk-behind grass mowing apparatus of claim 7, wherein the operator handle locking mechanism is further configured to lock the upper handle relative to the lower handle in the fully extended position, wherein the actuator is further configured to release the upper handle from the fully extended position.

9. The walk-behind grass mowing apparatus of claim 8, wherein the lower locking mechanism further comprises a locking seat configured to engage the lower handle foot and the lower plunger of the lower handle portion when the operator handle is in the folded position and lock the operator handle in the folded position.

10. The walk-behind grass mowing apparatus of claim 9, wherein the actuator of the operator handle locking mechanism is further configured to release the lower handle foot and lower plunger from the locking seat and unlock the operator handle from the folded position.

11. An operator handle for a turf maintenance apparatus, comprising:

an upper handle portion comprising an operator grip;

a lower handle portion comprising a mount hole and a lower plunger having a lower plunger slide range, wherein:

the lower plunger comprises a slide range portion defining the lower plunger slide range that extends through an opening in a bottom end of the lower handle portion into an interior of the lower handle portion;

the mount hole and the lower plunger slide range at least in part overlap and house a fastener that secures the lower handle portion to the turf maintenance apparatus;

the lower plunger is configured to slide within the interior of the lower handle portion a distance related to a length of the lower plunger slide range;

the lower plunger further comprises a lower handle foot that extends out from the opening in the bottom end of the lower handle portion to an exterior thereof a variable distance defined in part by the lower plunger slide range;

the lower handle portion is configured to rotate about the fastener at a rotation point coincident with the mount hole; and a locking mechanism located near a top of the lower handle portion comprising an actuator and an actuator arm, wherein the actuator arm is configured to lock the upper handle portion in an extended position with respect to the lower handle portion and wherein the actuator is configured to release the actuator arm and unlock the upper handle portion to move relative the lower handle portion.

12. The operator handle of claim 11, wherein:

the lower handle portion is configured to rotate between an extended position and a folded position relative the turf maintenance apparatus;

in the extended position the lower handle foot that extends out from the bottom opening of the lower handle portion engages a base plunger secured to the turf maintenance apparatus; and the engagement of the lower handle foot with the base plunger locks the lower handle portion in the extended position.

13. The operator handle of claim 12, wherein:

in the folded position the lower plunger and the lower handle foot engage a locking seat secured to the turf maintenance apparatus;

the locking seat pushes the lower plunger bottom pin upward within the lower plunger as the lower handle foot rotates into the locking seat; and the lower plunger bottom pin is released by the locking seat in response to the lower plunger bottom pin clearing the locking seat and being adjacent to a hole in the locking seat wherein the lower plunger bottom pin is forced into the hole by a mechanical bias within the lower handle portion and locks the lower handle portion in the folded position.

14. The operator handle of claim 13, wherein the operator handle further comprises:
   a lower plunger activation bias secured to a bottom of the upper handle portion that applies pressure to the lower plunger in a first direction within the lower handle portion;
   a lower plunger return bias, smaller in magnitude than the lower plunger activation bias, that applies pressure on the lower plunger in a second direction within the lower handle portion; wherein:
      when the upper handle portion is locked in a compressed position by the locking mechanism, the lower plunger activation bias moves the lower plunger within the lower handle portion in the first direction to a first extent of the lower plunger slide range;
      in response to activation of the actuator of the locking mechanism, the lower plunger activation bias is released from the lower plunger, enabling the lower plunger return bias to move the lower plunger into the lower handle portion in the second direction to a second extent of the lower plunger slide range;
      in response to the lower plunger moving to the second extent of the lower plunger slide range, the lower plunger bottom pin is removed from the hole in the locking seat and the lower handle portion is unlocked from the folded position.

15. The operator handle of claim 11, further comprising:
   an extension hole near a first end of the upper handle that overlaps a corresponding lower handle hole in the lower handle portion when the upper handle portion is in the extended position, wherein the actuator arm is situated through the extension hole and through the corresponding lower handle hole to lock the upper handle portion in the extended position with respect to the lower handle portion; and
   an additional hole near the operator grip of the upper handle that overlaps the corresponding lower handle hole in the lower handle when the upper handle portion is in a compressed position with respect to the lower handle portion, wherein the actuator arm is situated through the additional hole and through the corresponding lower handle hole to lock the upper handle portion in the compressed position with respect to the lower handle portion.

16. The operator handle of claim 11, wherein the locking mechanism further comprises an operator presence device that disables a motor or engine of the turf maintenance apparatus in response to the actuator releasing the actuator arm and the upper handle portion moving relative the lower handle portion.

17. The operator handle of claim 16, further comprising a second operator presence device positioned near the operator grip of the upper handle portion and configured to be activated by an operator, wherein the second operator presence device is separately configured to disable the motor or engine when not activated by the operator.

18. A base for securing an operator handle of a walk-behind turf maintenance apparatus, the base comprising:
   a first housing comprising a base plunger and a base plunger bias that applies a force to the base plunger pushing a tip of the base plunger through a hole in a seat of the first housing, wherein the base plunger engages a bottom of the operator handle and locks the operator handle in a first orientation when the bottom of the operator handle is positioned at the seat of the first housing; and
   a second housing comprising a second seat and a hole in the second seat that is engaged by a lower plunger of the bottom of the operator handle that locks the operator handle in a second orientation when the bottom of the operator handle is positioned at the second seat of the second housing;
      wherein the first housing and the second housing are displaced on a surface of the base and the first seat faces a first direction and the second seat faces a second direction, wherein the first and second directions are separated by an angle equal to or greater than ninety degrees.

19. The base of claim 18, wherein the first housing is aligned to a bottom of the operator handle when the operator handle is in an extended position for pushing the turf maintenance apparatus.

20. The base of claim 18, wherein the second housing is aligned to a bottom of the operator handle when the operator handle is in a folded position on a top surface of the turf maintenance apparatus.

21. The base of claim 18, wherein the operator handle is unlocked from the first orientation in response to the lower plunger of the operator handle providing a force against the base plunger that overcomes the base plunger bias, pushing the base plunger below the hole in the seat of the first housing.

22. The base of claim 18, wherein the operator handle is unlocked from the second orientation in response to the lower plunger being released from within the operator handle and disengaging the hole in the second seat.

23. The base of claim 18, wherein the second housing further comprises a guide rail that, in response to the bottom of the operator handle rotating to the seat of the second housing, guides a bottom pin of the lower plunger to a hole in the lower handle foot to engage with the hole in the second seat.

24. The base of claim 18, further comprising a mounting hole to which a pivot fastener rotatably secures the operator handle to the turf maintenance apparatus.

25. The base of claim 18, formed integrally as part of a body of the turf maintenance apparatus or fixedly fastened to the body of the turf maintenance apparatus.

* * * * *